(12) United States Patent
Larkin

(10) Patent No.: US 9,384,479 B2
(45) Date of Patent: Jul. 5, 2016

(54) MOBILE PHONE TAKEOVER PROTECTION SYSTEM AND METHOD

(71) Applicant: MOQOM LIMITED, Co. Dublin (IE)

(72) Inventor: Colin Larkin, Co. Dublin (IE)

(73) Assignee: MOQOM LIMITED (IE)

( * ) Notice: Subject to any disclaimer, the term of this patent is extended or adjusted under 35 U.S.C. 154(b) by 0 days.

(21) Appl. No.: 14/385,361

(22) PCT Filed: Mar. 15, 2013

(86) PCT No.: PCT/EP2013/055495
§ 371 (c)(1),
(2) Date: Sep. 15, 2014

(87) PCT Pub. No.: WO2013/135898
PCT Pub. Date: Sep. 19, 2013

(65) Prior Publication Data
US 2015/0038120 A1 Feb. 5, 2015

(30) Foreign Application Priority Data
Mar. 15, 2012 (IE) .................................. S2012/0139

(51) Int. Cl.
*G06Q 20/32* (2012.01)
*H04W 12/06* (2009.01)
*H04W 12/12* (2009.01)
*G06Q 20/38* (2012.01)
*H04W 8/26* (2009.01)

(52) U.S. Cl.
CPC .......... *G06Q 20/3223* (2013.01); *G06Q 20/385* (2013.01); *H04W 12/06* (2013.01); *H04W 12/12* (2013.01); *H04W 8/265* (2013.01)

(58) Field of Classification Search
CPC ... G06Q 20/3223; G06Q 20/385; H04W 12/12; H04W 12/06
USPC .................................................. 455/410, 411
See application file for complete search history.

(56) References Cited

U.S. PATENT DOCUMENTS

| 2009/0187759 | A1* | 7/2009 | Marsico ........................ 713/155 |
| 2011/0281551 | A1 | 11/2011 | Gonzalez et al. |
| 2012/0003957 | A1* | 1/2012 | Agevik et al. ................. 455/410 |

FOREIGN PATENT DOCUMENTS

EP 2128809 A1 12/2009

* cited by examiner

Primary Examiner — Leon Flores
(74) Attorney, Agent, or Firm — Volpe and Koenig, P.C.

(57) ABSTRACT

A method and a system are provided within a wireless network, for preventing fraudulent use of a Mobile Subscriber Integrated Services Digital Network Number (MSISDN) of a mobile phone terminal user. The IMSI and/or ICCID is associated with a respective Mobile Subscriber Integrated Services Digital Network Number (MSISDN) for the mobile phone terminal, and the associated IMSI and/or ICCID and MSISDN are stored. Upon receipt of a network request from a secure resource being accessed by the mobile phone user, the MSISDN is presented to the system. A Mobile Application Part (MAP) Send Routing Information (SRI) (or similar appropriate MAP query which can obtain the IMSI and/or ICCID) request to the wireless network is constructed for the extracted MSISDN, whereby the IMSI and/or ICCID currently associated with the MSISDN in the wireless network is obtained in reply to the SRI request. The obtained IMSI and/or ICCID is compared with the stored IMSI and/or ICCID for the extracted MSISDN and, if the obtained IMSI and/or ICCID matches the stored IMSI and/or ICCID for the extracted MSISDN, the mobile phone users network request is validated.

20 Claims, 11 Drawing Sheets

MOBILE PHONE TAKEOVER PROTECTION SYSTEM AND METHOD

FIELD OF THE INVENTION

The invention relates to a system and method for detecting changes in a Mobile Phone or any electronic device in order to identify and prevent fraud and identity theft.

BACKGROUND TO THE INVENTION

The usage and application areas of mobile phones are expanding, and more and more applications are using the mobile phone for authentication, payments, 2-factor authentication, fraud prevention measures and the like. To ensure that the mobile phone belongs to the subscriber is becoming increasingly important.

The term Service provider is used throughout the description of the invention to describe any organisation that is delivering a service that is either calling a user's mobile phone or sending a text to a user's mobile phone. A service provider can for example be, but is not limited to, a bank that is sending out 3D secure codes to access a bank account over the web, or it can be a credit card company sending out transaction information to their users using SMS text messages to their mobile phone. A service provider can also include, any user care organisation trying to contact a user by calling their mobile phone.

In relation to the described invention the term credit card can refer to any source of payment mechanism, for example; credit card, debit card, charge card, prepaid card, mobile wallet or even a bank account.

The Mobile Subscriber Integrated Services Digital Network Number (MSISDN) is a number that uniquely identifies a subscription in GSM, UMTS, LTE and future mobile networks. The MSISDN is the telephone number attached to the Subscriber Identity Module (SIM) card in a mobile/cellular phone. The SIM card contains a microchip that stores data that identifies the subscriber to the carrier. The data is also used to encrypt voice and data transmissions, making it nearly impossible to listen in on calls. Every mobile phone Subscriber Identity Module (SIM) card has a unique identifier called an International Mobile Subscriber Identity (IMSI), and the recent Universal Integrated Circuit Card (UICC) and existing Universal Subscriber Identity Module (USIM) technologies also contain an IMSI.

The International Mobile Subscriber Identity (IMSI) is a globally unique code number that identifies a GSM subscriber in the telecom network. The IMSI is linked to the account information with the carrier. The IMSI resides in the SIM card, which can be moved from one GSM phone to a different one.

The MSISDN together with IMSI are two important numbers used for identifying a mobile subscriber. The IMSI identifies the SIM, i.e. the SIM card is inserted into the mobile phone, while the MSISDN is used for routing calls to the subscriber. IMSI is often used as a key in the Home Location Register (HLR) (or similar database such as a Home Subscriber Server (HSS)). The MSISDN is normally the phone number that is entered to dial or send a text a mobile phone.

A SIM is uniquely associated to an IMSI, while the MSISDN can change in time (e.g. due to number portability), i.e. different MSISDN's can be associated to the SIM. Multiple MSISDNs can also be associated with one SIM card.

The Mobile Application Part (MAP) is a Signalling System number 7 (SS7) protocol which provides an application layer for the various nodes in GSM and UMTS mobile core networks and GPRS core networks to communicate with each other, in order to provide services to mobile phone users. The MAP specifications were originally defined by the GSM Association, but are now controlled by ETSI/3GPP.

MAP is defined by different standards, depending upon the mobile network type. For example:
MAP for GSM (prior to Release 4) is specified by 3GPP TS 09.02.
MAP for UMTS ("3G") and GSM (Release 99 and later) is specified by 3GPP TS 29.002.

The MAP is an application—layer protocol used to access the Home Location Register (HLR), Home Subscriber Server (HSS), Visitor Location Register (VLR), Mobile Switching Center (MSC), Equipment Identity Register, Authentication Centre, Short Message Service Center and Serving GPRS Support Node.

The primary functions of MAP are to provide mobility services, such as location management (roaming), authentication, managing service subscription information, etc.

But MAP also provides functionality for subscriber tracing and retrieving a subscriber's International Mobile Subscriber Identity (IMSI), described hereafter. A MAP service of particular relevance is the MAP_SEND_ROUTING_INFORMATION service (referred to as SRI herein). It is understood that any MAP service which is capable of returning a subscribers IMSI can be used in place of SRI. For example, MAP-SEND-IMSI. Depending on the traffic case of which the service is used, different information can be provided in its request/invoke and response/result messages. All the parameters available in the request and the response for the MAP_SEND_ROUTING_INFORMATION are listed in the following table.

| Parameter name | Request | Indication | Response | Confirm |
|---|---|---|---|---|
| Invoke Id | M | M(=) | M(=) | M(=) |
| Interrogation Type | M | M(=) | | |
| GMSC or gsmSCF Address | M | M(=) | | |
| MSISDN | M | M(=) | C | C(=) |
| OR Interrogation | C | C(=) | | |
| OR Capability | C | C(=) | | |
| CUG Interlock | C | C(=) | C | C(=) |
| CUG Outgoing Access | C | C(=) | C | C(=) |
| Number of Forwarding | C | C(=) | | |
| Network Signal Info | C | C(=) | | |
| Supported CAMEL Phases | C | C(=) | C | C(=) |
| Suppress T-CSI | C | C(=) | | |
| Offered CAMEL 4 CSIs | C | C(=) | | |
| Suppression of Announcement | C | C(=) | | |
| Call Reference Number | C | C(=) | | |
| Forwarding Reason | C | C(=) | | |
| Basic Service Group | C | C(=) | | |
| Basic Service Group 2 | C | C(=) | | |
| Alerting Pattern | C | C(=) | | |
| CCBS Call | C | C(=) | | |
| Supported CCBS Phase | C | C(=) | | |
| Additional Signal Info | C | C(=) | | |
| IST Support Indicator | C | C(=) | | |
| Pre-paging supported | C | C(=) | | |
| Call Diversion Treatment Indicator | C | C(=) | | |
| Long FTN Supported | C | C(=) | | |
| Suppress VT-CSI | C | C(=) | | |
| Suppress Incoming Call Barring | C | C(=) | | |
| gsmSCF Initiated Call | C | C(=) | | |
| Network Signal Info 2 | C | C(=) | | |
| IMSI | | | C | C(=) |
| MSRN | | | C | C(=) |
| Forwarding Data | | | C | C(=) |
| Forwarding Interrogation Required | | | C | C(=) |
| VMSC address | | | C | C(=) |

-continued

| Parameter name | Request | Indication | Response | Confirm |
|---|---|---|---|---|
| ReleaseResourcesSupported | | | C | C(=) |
| GMSC Camel Subscription Info | | | C | C(=) |
| Location Information | | | C | C(=) |
| Subscriber State | | | C | C(=) |
| Basic Service Code | | | C | C(=) |
| CUG Subscription Flag | | | C | C(=) |
| North American Equal Access preferred Carrier Id | | | U | C(=) |
| User error | | | C | C(=) |
| SS-List | | | U | C(=) |
| CCBS Target | | | C | C(=) |
| Keep CCBS Call Indicator | | | C | C(=) |
| IST Alert Timer | | | C | C(=) |
| Number Portability Status | | | U | C(=) |
| Supported CAMEL Phases in VMSC | | | C | |
| Offered CAMEL 4 CSIs in VMSC | | | C | C(=) |
| MSRN 2 | | | C | C(=) |
| Forwarding Data 2 | | | C | C(=) |
| SS-List 2 | | | C | C(=) |
| Basic Service Code 2 | | | C | C(=) |
| Allowed Services | | | C | C(=) |
| Unavailability Cause | | | C | C(=) |
| Provider error | | | | O |

The following convention is used for categorising parameters when defining the service primitives:
M the inclusion of the parameter is mandatory.
O the inclusion of the parameter is a service-provider option.
U the inclusion of the parameter is a service-user option.
C the inclusion of the parameter is conditional and can be used for the following purposes:
  to indicate that if the parameter is received from another entity it must be included for the service being considered;
  to indicate that the service user must decide whether to include the parameter, based on the context on which the service is used;
  to indicate that one of a number of mutually exclusive parameters must be included (e.g. parameters indicating a positive result versus parameters indicating a negative result);
  to indicate that a service user optional parameter (marked "U") or a conditional parameter (marked "C") presented by the service user in a request or response type primitive is to be presented to the service user in the corresponding indication or confirm type primitive;
(=) when appended to one of the above, this symbol means that the parameter takes the same value as the parameter appearing immediately to its left;
"blank" means that the parameter is not present.

A Send Routing Information Request on a given mobile number will return the following information:
  *Number <Mobile Number>
  *IMSI <International Mobile Subscriber Identity>
  *MCC <Mobile Country Code>
  *MNC <Mobile Network Code>
  *Operator Name <Name of the Mobile Operator in home country>
  *Operator Country <Mobile handset home country>
  *MSC <Mobile Switching Centre in the country of mobile handset's current location>
  *MSC Operator <Operator in the country of mobile handset's current location>
  *MSC Country <Current handset location country>
  *MSC Location <Current handset location>
  *MSC MCC <Current Mobile Country Code>
  *MSC MNC <Current Mobile Network Code>

Mobile Phone Hijacking

Fraudsters will attempt to hijack a person's mobile phone to impersonate the person or to illegally obtain information, or use it for illegal authentication of monetary transactions, access to a restricted website, bank site, money laundering and more.

A fraudster could hijack or take over an owner's mobile phone number by gaining sufficient information of that user through identity theft. This information could be used to persuade the owner's mobile phone operator to perform a SIM change on the owner's mobile phone number. Once a fraudster has hijacked another owner's mobile number, the fraudster and not the rightful owner of the mobile phone would, for example, receive all text messages or phone calls made to that phone number. This would mean that the fraudster would receive any sensitive or secure information that was sent to the rightful owner's mobile phone.

A mobile phone can be taken over in multiple ways; For example; a fraudster ships a new, unused mobile phone SIM card to the country where the fraudster plans to make the fraudulent transactions on the mobile phones owner's credit card or debit card. Next the fraudster will contact the mobile operator's Customer Care and persuade the operator to make the SIM change. If the fraudster is successful in changing the SIM, the mobile phone of the owner is now in the possession of the fraudster. This means that any phone calls or SMS text messages intended for the mobile phone number will be received and responded to by the fraudster.

Recent events have shown that attackers target SIM Cards in Bank Fraud attempts. Attackers are using some new schemes that combine old phishing tactics with some newer techniques in order to steal or disable the SIM cards in the victims' mobile phones and then take them over for use in fraudulent bank transactions.

Mobile phones have become high-value targets for attackers in many different kinds of schemes, including fake online banking applications, compromised legitimate applications and phishing scams. The most recent fraud schemes in this field rely on some classic phishing tactics adapted for the mobile platform as well as some real-world physical techniques in order to separate victims from their money. SIM card theft is a serious problem in some countries where it is common for users to buy unlocked phones rather than committing to a contract with a carrier. Two such typical scams are schematically illustrated in FIG. 1.

The first scam involves attackers using trojans as part of a phishing attack aimed at stealing the user's mobile phone IMEI number. That number is a unique identifier for the phone itself. The attackers are using code injection to show users a prompt from their online banking site asking them to enter their IMEI numbers in order to access their accounts. Once the attackers have the IMEI number, they then call the victim's carrier and report the phone lost or stolen and ask for a new SIM card. With that in hand, the attackers then receive the one-time passwords meant for the victim for her bank account and the victim is then relieved of her money.

The second scheme is somewhat related to the first in that it is aimed at getting hold of the victim's SIM card. In this case, the attacker uses a phishing attack to get a victim's personal information, including bank details and name and address. He then goes to the police and reports the phone stolen and follows up by going to the victim's wireless carrier and making the same report, saying the SIM card was stolen.

With that done, the carrier may issue the attacker a new SIM card and the attacker will again get access to the victim's one-time passwords.

The common thread in both schemes is that they are made possible by compromising the web browser with a trojan attack to steal the victim's credentials. By combining stolen personally identifiable information with misrepresentation techniques, criminals using these attacks do not need to trick users into verifying fraudulent transactions. They are able to bypass out of band authentication mechanisms like SMS-delivered One-Time-Passwords by authorizing these transactions themselves.

Churn

In the telecommunications industry, churn is the term used to describe user attrition or loss. In short, it refers to the tendency of Internet and cell-phone subscribers to switch telecom providers. There are different types of churn such as voluntary, involuntary and internal. The most common reasons for churn are dissatisfaction with an existing provider, the lure of a lower price for equivalent service from a different provider, and the lure of better service for the same price from a different provider.

Churn can also result from a change in the subscriber's geographic location, the desire for increased connection speed, or a need for different or enhanced cell-phone coverage.

In the context of the invention, churn refers to the situation where a user's mobile number has either become inactive through cancellation or expiry, and the mobile number is then re-assigned to a different user. The essential part is that either the Mobile number has been re-assigned to another person (knowingly or unknowingly), and any services or applications using this mobile number to send information, service access (authentication) or similar has not been updated with this change. This exposes the previous owner of the mobile phone number to potential fraud on their account.

Take the following example from a Bank or Credit Card fraud prevention scenario, illustrated schematically in FIG. 2:
- A user provides their Issuer with their mobile phone number.
- Over time the user's mobile phone subscription is cancelled.
- Eventually their mobile operator will place the number in "quarantine".
- After a period of time, the mobile phone number will be taken out of quarantine and then reassigned to a new mobile user.
- The user details is then never updated in the service providers system, so the service provider still believes that the mobile number belongs to the user.
- Should the service provider now try to contact their user by phone or SMS text message, the service provider may be unaware that they are actually communicating with someone other than their user as the mobile number has been reallocated to a different person.

Service Access/2-Factor Authentication

Mobile Phones can be used to gain access to a service or webpage. For example as part of 2-factor authentication a user would typically log in with some known login details, and then he/she would be prompted to enter a authentication code that was sent to the user's mobile number. By entering login details and the authentication code that was sent to the user's mobile, access can for example be gained to an online banking webpage, or similar.

Where mobile phones are used for 2-Factor Authentication, authorisation, sending of sensitive information, only the MSISDN is used. The IMSI is never checked. It is possible to hijack a mobile number by getting a new SIM card and impersonate a person to switch an existing number to the new SIM card. Institutions using the mobile phone number to send information or authentication codes will never know that the IMSI or SIM card changed, and will therefore keep sending sensitive information to the Mobile number (MSISDN). Alternatively, if an organisation is trying to call their user on the mobile phone to discuss personal details, e.g. account information, the organisation will not know for sure that they are speaking to the correct person if the mobile number has been hijacked.

It is therefore vital that the application issuing the authentication code to the user's mobile phone is certain that the mobile number the authentication code is sent to the right person and mobile handset.

3D Secure

Sending a dynamic secure code to a 3D Secure user for 3D secure transaction is an inexpensive and efficient way for a bank to implement dynamic 3D Secure techniques.

However, the risk of SIM takeover forces many banks to avoid using SMS as means to communicate dynamic secure code for 3D Secure transactions.

This invention aims to eliminate the above risks by targeting any fraud related to the above areas, to ensure that the mobile phone number has not been compromised in any way or form and to ensure delivery of the secure code to the correct mobile phone/SIM card.

SUMMARY OF THE INVENTION

The invention relates to a system and method, as defined in the appended claims, for detecting changes to the International Mobile Subscriber Identity (IMSI) and/or Integrated Circuit Card Identifier (ICCID) number for a Mobile Phone or device in order to prevent fraud and identity theft. In particular, the invention relates to a system and method for detecting and recording any changes to the IMSI and/or ICCID number registered to a MSISDN for a given mobile phone, and using of this information to prevent any further changes arising from fraud and identity theft. It will be appreciated that in the context of the present invention the use of the IMSI or ICCID as a unique identifier can be used interchangeably and can be used for the same means in order to bring the invention into practice.

The invention named SIM Takeover Protection, allows a service provider, e.g. a bank or credit card company, to do the following;
- detect if a fraudster takes over a another person's mobile number;
- ensure phone calls and SMS messages are sent to and received from the genuine user;
- ensure data traffic to and from a phone are from the genuine user; and
- payments made using a mobile phone are made with the genuine phone or device.

Accordingly, in a first aspect of the present invention, a method of preventing fraudulent use of a Mobile Subscriber Integrated Services Digital Network Number (MSISDN) of a mobile phone terminal in a network, comprising the steps of:
- associating an International Mobile Subscriber Identity (IMSI) with a respective MSISDN for the mobile phone terminal;
- storing the associated IMSI and MSISDN; and
- upon receipt of a network request from the mobile phone terminal for a secure resource;
- extracting the MSISDN from the network request;

constructing a Mobile Application Part (MAP) message request to the network for the extracted MSISDN;

obtaining the IMSI currently associated with the MSISDN in the wireless network in reply to the MAP request;

comparing the obtained IMSI with the stored IMSI for the extracted MSISDN; and if the obtained IMSI matches the stored IMSI for the extracted MSISDN, validating the network request.

In an embodiment of the invention, the associating step may comprise the further steps of performing a MAP SRI on a communicated MSISDN and obtaining the IMSI currently associated with the communicated MSISDN in reply. In a variant of this embodiment, the associating step may comprise the further step of receiving a communicated batch file storing at least a plurality of MSISDN.

In an embodiment of the invention, the step of storing may comprise the further steps of date—stamping and time—stamping the associated IMSI and MSISDN.

In an embodiment of the invention, the associating step may comprise the further step of associating a provider of secure resources with the associated IMSI and MSISDN.

In an embodiment of the invention, the method may comprise the further step of generating an alarm if the obtained IMSI does not match the stored IMSI for the extracted MSISDN. In a variant of this embodiment, the method may comprise the further step of automatically querying the provider if the obtained IMSI does not match the stored IMSI for the extracted MSISDN.

In an embodiment of the invention, the method may comprise the further step of obtaining position data of the mobile phone terminal from positioning means thereof.

In an embodiment of the invention, the of validating may further comprises automatically communicating the requested secure resource to the mobile phone terminal.

In an embodiment the invention identifies that the current IMSI is different to a trusted stored MSI stored within the service, the method comprises the steps of storing the current IMSI as well as the time the query was performed such that when another query is performed the current IMSI matches the suspect IMSI from the last query check and if a sufficient length of time has passed between the two IMSI checks a determination can be made that the suspect IMSI comprises a legitimate IMSI change.

In an embodiment the invention provides the step of generating a first and a second one time passwords and temporarily stored, wherein in response to a query, if the current IMSI matches a trusted IMSI stored in the service then the service will send the first one time password to the mobile phone terminal enabling one level of access to the secure resource or if the current IMSI does not match the trusted IMSI stored in the service, then the service will send the second one time password to the mobile phone terminal enabling a second level of access to the secure resource.

In an embodiment the MAP message request comprises a Mobile Application Part (MAP) Send Routing Information (SRI) request.

According to another aspect of the present invention, there is also provided a system for preventing fraudulent use of a Mobile Subscriber Integrated Services Digital Network Number (MSISDN) of a mobile phone terminal in a network, comprising:

means for associating an International Mobile Subscriber Identity (IMSI) with a respective MSISDN for the mobile phone terminal;

storage means the associated IMSI and MSISDN; and network means adapted to receive a network request from the mobile phone terminal for a secure resource;

validating means adapted to extract the MSISDN from the network request;

construct a Mobile Application Part (MAP) message request to the wireless network for the extracted MSISDN; obtain the IMSI currently associated with the MSISDN in the wireless network in reply to the MAP request; compare the obtained IMSI with the stored IMSI for the extracted MSISDN; and if the obtained IMSI matches the stored IMSI for the extracted MSISDN, validate the network request.

In an embodiment of the invention, the associating means and the storage means may comprise at least one database and the validating means may comprise a mobile network interrogator data processing module, stored and processed by a server operably connected to the wireless network. In a variant of this embodiment, the mobile network interrogator data processing module may be adapted to perform a MAP SRI on a communicated MSISDN and to obtain the IMSI currently associated with the communicated MSISDN in reply. In a variant of this later embodiment, the associating means may further comprise a batch interface server data processing module adapted to receive a communicated batch file storing at least a plurality of MSISDN.

In an embodiment of the invention, the database may comprise at least a first table storing a plurality of associated IMSI, MSISDN further associated with respective unique identifiers (Org_ID) of secure resource providers, having at least one logical primary key expressed as IMSI+MSISDN+Org_ID. In a variant of this embodiment, the validating means may be further adapted to automatically query the provider if the obtained IMSI does not match the stored IMSI for the extracted MSISDN.

In an embodiment of the invention, the database may comprise a second table logically related to the first table and storing the IMSI, MSISDN and at least one alarm parameter. In a variant of this embodiment, the system may further comprise means for generating an alarm if the obtained IMSI does not match the stored IMSI for the extracted MSISDN.

In an embodiment of the invention, the system may further comprise a distributed interface allowing a remote user to query the validating means as to whether the IMSI for a given MSISDN is valid.

In an embodiment of the invention, the validating means may usefully be further adapted to detect patterns of repeated use of a same IMEI/MEID with a plurality of IMSI.

In an embodiment of the invention, the validating means may advantageously be further adapted to communicate the MAP SRI to a Home Location Register (HLR) (or similar database such as a Home Subscriber Server (HSS)) in a foreign portion of the wireless network to which the mobile number of the mobile phone terminal belongs.

In a particularly time-efficient embodiment of the invention, the validating means may be further adapted to automatically communicate the requested secure resource to the mobile phone terminal.

For any of the above embodiments of the method and system of the invention, the network request from the mobile phone terminal for a secure resource is preferably selected from the group comprising a phone call, a Short-Message-Service (SMS) message, a near-field, routed wireless electronic transaction, data request from software running on a mobile phone terminal or a stand-alone secure resource, for example, but not limited to, accessing an online banking portal or accessing a secure remote server.

According to a further aspect of the present invention, there is also provided a set of instructions recorded on a data carrying medium which, when read from the medium and processed by a data processing terminal having networking means and configured as, or connected to, a wireless network gateway, configures the terminal to prevent fraudulent use of a Mobile Subscriber Integrated Services Digital Network Number (MSISDN) of a mobile phone terminal in a wireless network, by performing the data processing steps of:
- associating an International Mobile Subscriber Identity (IMSI) with a respective MSISDN for the mobile phone terminal;
- storing the associated IMSI and MSISDN; and
- upon receipt of a network request from the mobile phone terminal for a secure resource;
- extracting the MSISDN from the network request;
- constructing a Mobile Application Part (MAP) message request to the wireless network for the extracted MSISDN;
- obtaining the IMSI currently associated with the MSISDN in the wireless network in reply to the MAP request;
- comparing the obtained IMSI with the stored IMSI for the extracted MSISDN; and
- if the obtained IMSI matches the stored IMSI for the extracted MSISDN, validating the network request.

In another embodiment there is provided a method for preventing fraudulent use of a Mobile Subscriber Integrated Services Digital Network Number (MSISDN) of a mobile phone terminal in a wireless network, comprising the steps of:
- associating an Integrated Circuit Card Identifier (ICCID) with a respective MSISDN for the mobile phone terminal;
- storing the associated ICCID and MSISDN; and
- upon receipt of a network request from the mobile phone terminal for a secure resource;
- extracting the MSISDN from the network request;
- constructing a Mobile a message request to the wireless network for the extracted MSISDN;
- obtaining the ICCID currently associated with the MSISDN in the wireless network in reply to the message request;
- comparing the obtained ICCID with the stored ICCID for the extracted MSISDN; and
- if the obtained ICCID matches the stored ICCID for the extracted MSISDN, validating the network request.

In a further embodiment there is provided a system for preventing fraudulent use of a Mobile Subscriber Integrated Services Digital Network Number (MSISDN) of a mobile phone terminal in a network, comprising:
- means for associating an Integrated Circuit Card Identifier (ICCID) with a respective MSISDN for the mobile phone terminal;
- storage means the associated ICCID and MSISDN; and
- network means adapted to receive a network request from the mobile phone terminal for a secure resource;
- validating means adapted to extract the MSISDN from the network request;
- construct a message request to the wireless network for the extracted MSISDN; obtain the ICCID currently associated with the MSISDN in the wireless network in reply to the message request; compare the obtained ICCID with the stored ICCID for the extracted MSISDN; and
- if the obtained ICCID matches the stored ICCID for the extracted MSISDN, validate the network request.

The invention thus provides a method of detecting whether the International Mobile Subscriber Identity (IMSI) number attached to a Mobile Subscriber Integrated Services Digital Network Number (MSISDN) has changed for a subscriber or not. The method is embodied in a corresponding system distributing a service which can be implemented as a hosted service, thus distributed substantially in real-time, or a standalone service where a Service Provider may integrate the system and method of the invention within their own network infrastructure. Accordingly, the principles disclosed herein apply to any future implementations of IMSI and MSISDN used in mobile networks, whether current such as 3G WCDMA and 4G LTE or yet to be provided.

The SIM Takeover Protection system can determine if the IMSI of a Mobile number (MSISDN) has changed for a mobile subscriber and therefore whether the Mobile number (MSISDN) has been potentially compromised.

The SIM Takeover Protection service could also be integrated to services where the mobile phone is used to obtain the owner's location information to verify if the owner is in a specific location. Mobile phones can for example be used by credit card fraud prevention systems or similar to gain information of the location of an account holder or credit card owner at the time of when a transaction occurs on an owner's account to verify that the owner is either in the country or in near proximity of where the transaction is taking place. Mobile phones can also be used by systems to send SMS text messages containing a 2-factor Authentication code to access a specific service or secure website.

The SIM Takeover Protection service can be integrated to, but is not limited to, any services where a fraudster can compromise another user's mobile phone number. Some example services where the invention can be applied are described below:
- Online banking users or other secure access services that is sending SMS text messages to their users containing their Two Factor Authentication (2FA) login credentials. Any fraudster that would hijack or take over a SIM card of a user of these kinds of services will have full access to the user's online banking service.
- If the cardholder has an iPhone or Android banking application on their phone the fraudster can insert the hijacked SIM card into a phone identical to the cardholder and attempt to use the cardholder's smart phone banking service.
- In the very near future cardholders will increasingly use their mobile phones as their primary credit/debit card. This is enabled through contactless payment technologies (Near Field Communication—NFC). Taking over a user's mobile phone account is the obvious first step to defrauding contactless mobile payment enabled cardholders.
- Where a phone call is made to or from a cardholder. For example if a bank is trying to contact their user by calling their mobile phone, the phone could have been taken over by a fraudster, so when the bank calls the mobile number, there is no guarantee that they are speaking to the correct person.
- Sending a dynamic secure code to a 3D Secure user for 3D secure transaction is an inexpensive and efficient way for a bank to implement dynamic 3D Secure. However, the risk of SIM takeover forces many banks to avoid using SMS as means to communicate dynamic secure code for 3D Secure transaction. This invention eliminates the risk and ensures delivery of the secure code to correct mobile phone/SIM card.

The invention can identify and flag to the service provider if any of the above scenarios should occur. The invention will ensure the following:
- Any phone calls and SMS messages to and from the service provider's user mobile phone are with the same phone the user originally registered with the service provider (can be a bank, or credit card company, or a mobile operator, etc).

The service safeguards that online banking 2FA credentials sent using SMS text messages, are delivered to the same phone the user originally registered with the service provider.

Each time a user makes a transaction using their Smartphone application, the SIM Takeover Protection service can verify that the transaction is originating from the same phone that was first registered by the cardholder.

When a contactless payment is made via a contactless payment enabled phone, the invention can again verify that the transaction is originating from the same phone that was first registered by the cardholder.

The invention also has substantial benefits when it comes to Anti Money Laundering (AML) measures. The invention can for example be used to significantly increase confidence that their representatives are actually talking to the real user and not an impersonator that has taken over another user's mobile phone account.

The invention can also be applied to detect churn in the telecom network. Mobile phone churning occurs when a user's mobile number becomes inactive through cancellation and the mobile operator reassigns the mobile number to a different user.

The invention can identify churned mobile phone numbers and flag this to the service provider for appropriate action. The SIM Takeover Protection service will identify that the IMSI has changed for the Mobile number (MSISDN) in question. In many situations, churn detection can happen even before a service provider attempts to communicate with their cardholder.

The invention can be integrated into existing fraud prevention services to provide additional security. The invention allows service provider's that integrates or make use of the invention to communicate with users with increased confidence that they are talking to their actual users. The invention will safeguard that any location service lookups and transaction location verification queries based on the mobile phone location are being performed on the actual owner's mobile number and not a fraudster's hijacked phone.

The invention provides, but is not limited to, an XML web services interface towards any service provider that wants to avail of the service. The User Management System or the Service Provider can use the XML interface directly. The XML interface will allow any system to query if the IMSI for a given MSISDN and organisation (Org_ID) have changed. The XML response to the query will include, but is not limited to, a flag to indicate whether or not the given organisation (Org_ID) has subscribed to the service, the status of the IMSI check (whether or not the IMSI had changed), the current value of the "IMSI Verified Flag", etc.

The invention also exposes a User Management System (Web GUI, application, etc) where the user of the system can view all active alarms. If there is a change to the IMSI for one MSISDN, the IMSI Alarm Table will be updated, and an alarm will be raised in the Web GUI/Application. The Alarm will indicate to the user (e.g. a service provider like a bank or credit card company) that the user should be contacted to verify the IMSI change.

The invention can be incorporated in to any Fraud Detection System that is based on a scoring system. If the IMSI has been hijacked, this could contribute to the overall fraud score. Higher score will indicate a higher risk that a transaction or person is fraudulent.

Taking as a basic premise that the mobile phone is now at the heart of, or involved in, many different transactions, some of the problems which the distributed method and system of the invention solves are:

confirming that a user's mobile phone's Near Field Communication (NFC) payment was actually made with the user's phone;

confirming that any SMS (or other notification) sent to the user's phone containing a One Time Password (OTP) is delivered to the actual user's phone and not a fraudster. The OTP could be used for example:
  to gain access to a service (e.g. login to a website)
  to verify a transaction (verify an online 3DSecure card transaction—e.g. MasterCard™'s secure code or Visa™'s Verified by Visa™)

confirming that an SMS to or received from a user's mobile phone is being sent to or received from the actual user (e.g. SMS banking) and not a fraudster confirming that a phone call to or from a user is actually to or from the actual user and not a fraudster confirming that a request from a software application running on the user's mobile phone originates from the relevant mobile phone (e.g. smartphone online banking application) and not a fraudster

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE DRAWINGS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 3:
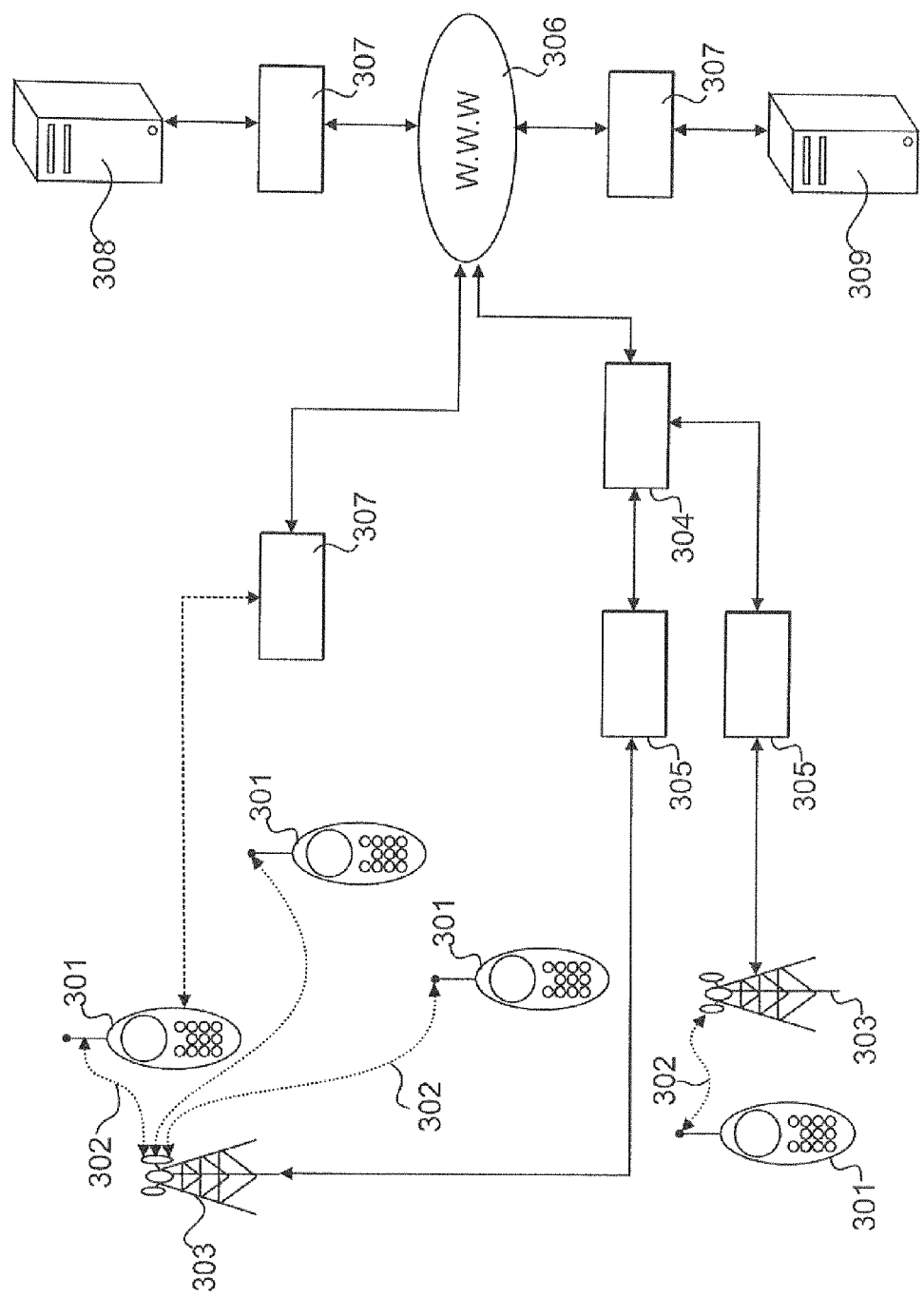
FIG. 3 shows a network environment comprising a communication network, a plurality of mobile data processing terminals and at least one remote server.
Figure 4:
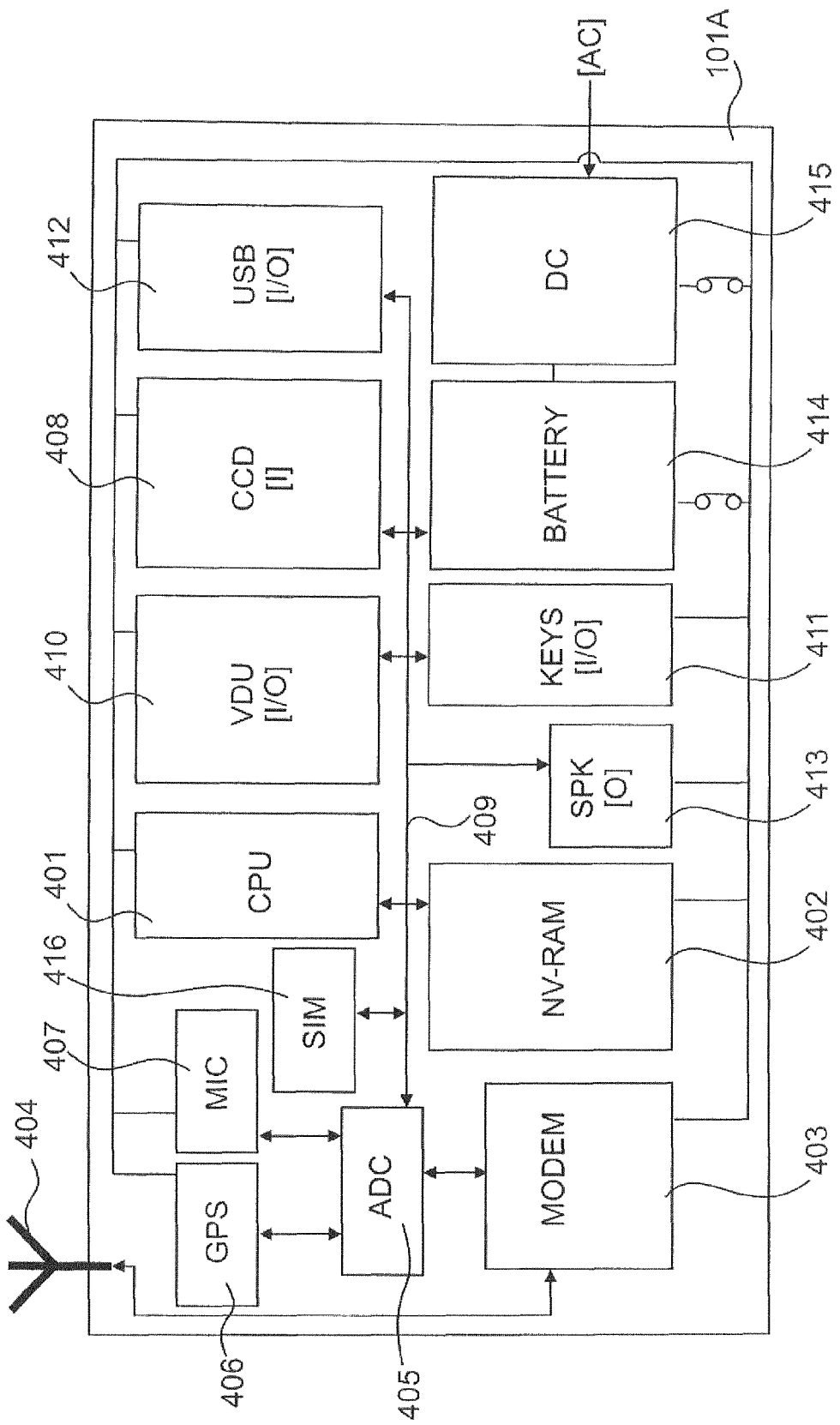
FIG. 4 is a logical diagram of a typical hardware architecture of a mobile computing device shown in FIG. 3, including a SIM module.
Figure 5:
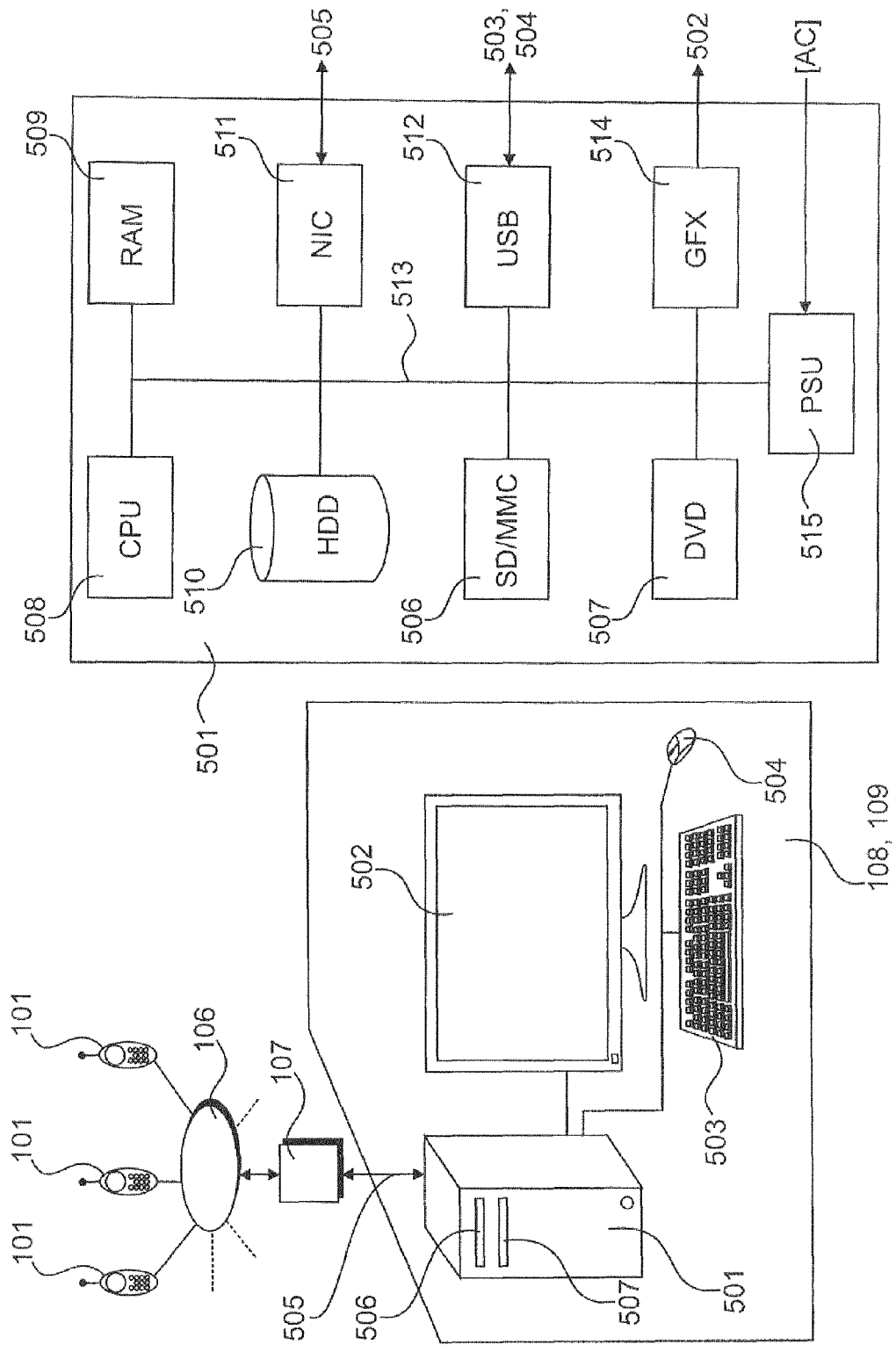
FIG. 5 is a logical diagram of a typical hardware architecture of the remote server shown in FIG. 3, including memory means.

With reference to FIGS. 3 to 5, an example embodiment of a system according to the invention is shown within a networked environment comprising a plurality of mobile computing devices 301 connected to a wireless communication network 300 as described hereafter, each adapted to communicate with at least a first remote server 308 configured according to the invention for detecting and recording any changes to the IMSI number registered to a MSISDN that mobile computing device 301, and using of this information to prevent any further changes arising from fraud and identity theft. The environment will typically include further remoter servers 309 of Service Providers, for instance banks and the like, the resources made available by which are distributed to a plurality of mobile computing devices 301 on authenticated request.

In the example therefore, each user is equipped with a respective mobile computing device 301, typically a mobile telephone handset 301, also known as a 'smartphone'. Each mobile telephone handset 301 has wireless telecommunication emitting and receiving functionality over a cellular telephone network 300 configured according to the International Mobile Telecommunications-2000 ('IMT-2000') network industry standards, thus including UMTS/CDMA-2000/EDGE or '3G', IEEE802.16e/LTE Advanced or '4G', and wherein telecommunication is performed as voice, alphanumeric or audio-video data using the Short Message Service ('SMS') protocol, the Wireless Application protocol ('WAP') the Hypertext Transfer Protocol ('HTTP') or the Secure Hypertext Transfer Protocol ('HTTPS'). The handset 301 is preferably that commonly referred to as a 'smartphone' and may for instance be an iPhone™ handset manufactured by the Apple Corporation or a Nexus One™ handset manufactured for Google, Inc. by the HTC Corporation.

The mobile telephone handset 301 receives or emits voice, text, audio and/or image data encoded as a digital signal over a wireless data transmission 302 in the network 300, wherein the signal is relayed respectively to or from the handset by the geographically-closest communication link relay 303 of a plurality thereof. The plurality of communication link relays 303 allows digital signals to be routed between the handset 301, as it is geographically displaced in use, and its communication target(s) by means of a remote gateway 304 via a MSC or base station 305. The gateway 304 is for instance a communication network switch, which couples digital signal traffic between wireless telecommunication networks, such as the cellular network 300 within which wireless data transmissions 302 take place, and another network 306 with a different protocol or topography, for instance a Wide Area Network ('WAN') such as the Internet 306. Accordingly, the gateway 304 further provides protocol conversion if required, for instance whether a handset 301 uses the WAP or HTTPS protocol to communicate data.

Alternatively, or additionally, the mobile telephone handset 301 may have wireless telecommunication emitting and receiving functionality over a wireless local area network ('WLAN') conforming to the 802.11 standard ('Wi-Fi'). In the WLAN, telecommunication is likewise performed as voice, alphanumeric and/or audio-video data using the Internet Protocol (IP), Voice data over IP ('VoIP') protocol, Hypertext Transfer Protocol ('HTTP') or Secure Hypertext Transfer Protocol ('HTTPS'), the signal being relayed respectively to or from the data processing device 301 by a wireless (WLAN) router 307 interfacing the mobile data communication device 301 to a WAN communication network 306.

Generally, the computing device 301 may be any portable data processing device having at least data processing means, data display means, wireless communication means and an interface means suitable for accessing a repository of mobile applications and communicating with remote terminal 301 as described hereafter. It will therefore be readily understood by the skilled person from the present disclosure, that the mobile computing device 301 may instead be a portable computer commonly referred to as a 'laptop' or 'netbook', a tablet computer such as an Apple™ iPad™ or a Motorola™ XOOM™, a personal digital assistant such as an Hewlett-Packard™ iPaq™, and the like.

A typical hardware architecture of the mobile telephone handset 301 of the example is shown in FIG. 4 in further detail, by way of non-limitative example. The handset 301 firstly includes a data processing unit 401, for instance a general-purpose microprocessor ('CPU'), acting as the main controller of the handset 301 and which is coupled with memory means 402, comprising non-volatile random-access memory ('NVRAM'), either permanently embedded within the terminal or in the form of a removable data storage medium such as an SD or mini-SD card, or both.

Figure 1:
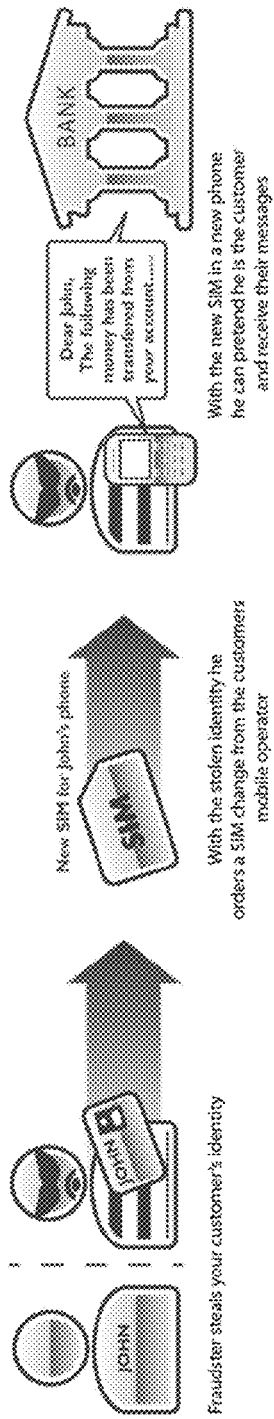
FIG. 1 illustrates an example of fraud as the result of identity theft in a mobile network, wherein a fraudster takes a cardholder's mobile phone over by persuading the cardholder's mobile operator to perform a SIM change.

The mobile telephone handset 301 further includes a modem 403 to implement the wireless communication functionality, as the modem provides the hardware interface to external communication systems, such as the closest communication link relay 303 and ensuing cellular telephone network 304, 305 shown in FIG. 1. An aerial 404 coupled with the modem 403 facilitates the reception of wireless signals from nearby communication link relays 303. The modem 403 is interfaced with, or includes, an analogue-to-digital converter ('ADC') 405 for demodulating wavelength wireless signals received via the antenna 404 into digital data, and reciprocally for outgoing data.

The handset 301 may further include self-locating means in the form of a GPS receiver 406, wherein the ADC 405 receives analogue positional and time data from orbiting satellites (not shown), which the data processing unit 401 or a dedicated data processing unit processes into digital positional and time data.

The handset 301 further includes a sound transducer 407, for converting ambient sound waves, such as the user's voice, into an analogue signal, which the ADC 405 receives for the data processing unit 401 or a dedicated data processing unit to process into digital audio data.

The handset 305 may further include imaging means 408 in the form of an electronic image sensor, for capturing image data which the data processing unit 401 or a dedicated data processing unit processes into digital image data.

The CPU 401, NVRAM 402, modem 403, GPS receiver 406, microphone 407 and digital camera 408 are connected by a data input/output bus 409, over which they communicate and to which further components of the handset 301 are similarly connected, in order to provide wireless communication functionality and receive user interrupts, inputs and configuration data.

Alphanumerical and/or image data processed by CPU 401 is output to a video display unit 410 ('VDU'), from which user interrupts may also be received if it is a touch screen display. Further user interrupts may also be received from a keypad 411 of the handset or from an external human interface device ('HiD') connected to the handset via a Universal Serial Bus ('USB') interface 412. The USB interface advantageously also allows the CPU 401 to read data from and/or write data to removable storage devices. Audio data processed by CPU 401 is output to a speaker unit 413. Power is provided to the handset 301 by an internal module battery 414, which an electrical converter 415 charges from a mains power supply as and when required.

Importantly, the mobile telephone handset 301 further includes a Subscriber Identity Module (SIM) 416 uniquely identifying the handset to the network 300, in that it permanently stores data representative of its unique serial number (ICCID), international mobile subscriber identity (IMSI), security authentication and ciphering information, as well as temporary information related to the local network 300.

Figure 6:
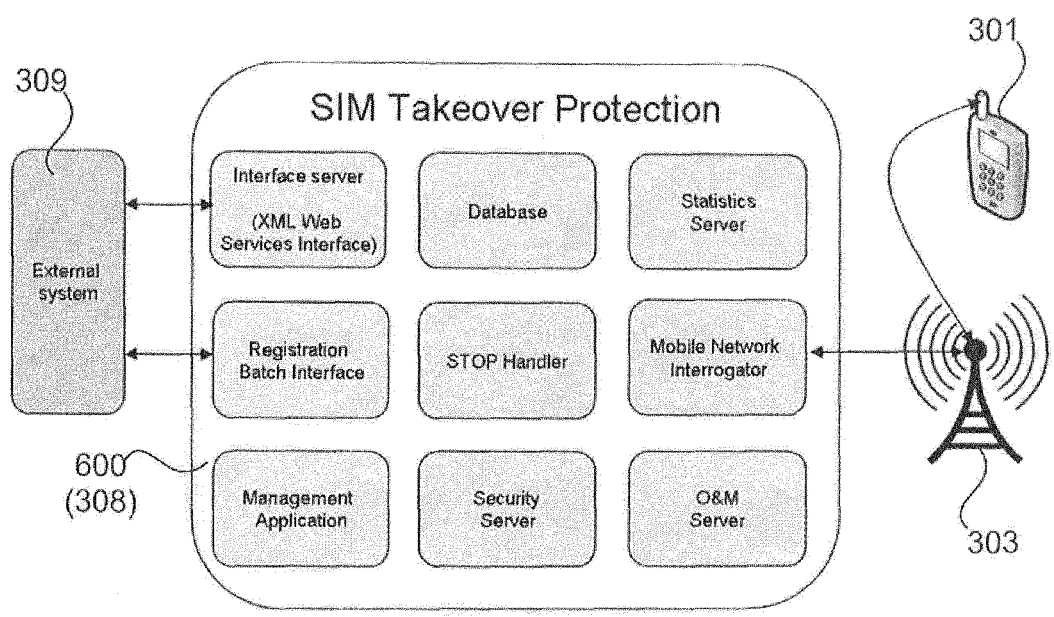
FIG. 6 provides graphical overview of a plurality of components stored and processed in the memory means of the server within the environment of FIGS. 1 to 5.

The networked environment next includes at least the first data processing terminal 308 configured as a server and which communicates, stores and processes data with a plurality of components described in further detail hereafter with reference to FIG. 6. Accordingly, the server 308 emits and receives data encoded as a digital signal over a wired data transmission conforming to the IEEE 802.3 ('Gigabit Ethernet') standard, wherein the signal is relayed respectively to or from the computing device by a wired router 307 interfacing the server 308 to the WAN communication network 306. Generally, the server 308 may be any portable or desktop data processing device having networking means apt to establish a data communication with any one mobile communication device 301.

A typical hardware architecture of the data processing terminals 308, 309 is now shown in FIG. 5 in further detail, by way of non-limitative example. Each data processing device 308, 309 is typically a computer configured with a data processing unit 501, data outputting means such as video display unit (VDU) 502, data inputting means such as HiD devices, commonly a keyboard 503 and a pointing device (mouse) 504, as well as the VDU 502 itself if it is a touch screen display, and data inputting/outputting means such as a wired network connection 505 to the communication network 306 via the router 307, a magnetic data-carrying medium reader/writer 506 and an optical data-carrying medium reader/writer 507.

Within data processing unit 501, a central processing unit (CPU) 508 provides task co-ordination and data processing functionality. Sets of instructions and data for the CPU 508 are stored in memory means 509 and a hard disk storage unit 510 facilitates non-volatile storage of the instructions and the data. A network interface card (NIC) 511 provides the interface to the network connection 505. A universal serial bus (USB) input/output interface 512 facilitates connection to the keyboard and pointing devices 503, 504.

All of the above components are connected to a data input/output bus 513, to which the magnetic data-carrying medium reader/writer 506 and optical data-carrying medium reader/writer 507 are also connected. A video adapter 514 receives CPU instructions over the bus 513 for outputting processed data to VDU 502. All the components of data processing unit 501 are powered by a power supply unit 515, which receives electrical power from a local mains power source and transforms same according to component ratings and requirements.

FIG. 6 illustrates a high-level overview of the various components composing the SIM Takeover Protection service 600 embodied at the server 308, which performs the method of the invention. The SIM Takeover Protection service 600 is integrated to any external systems 309 availing of the service through an Interface Server and a Registration Batch Interface. The Interface Server can expose different interfaces, but in this instance an XML Web Service Interface is shown. The invention is not limited to this interface only. The Interface Server allows external systems 309 to send information to the SIM Takeover Protection service to request a service. External systems 309 can for example send a query to the SIM Takeover Protection Service to check is an IMSI for a MSISDN has changed.

The Batch Interface server is used during registration for new users or to update information for existing users, e.g. that have changed mobile numbers. The Batch Interface server can handle any file formats, e.g. Microsoft Excel Spreadsheets, CSV files, XML files, etc. The Batch Interface Server will parse any data received and pass on the information to the STOP Handler. The STOP Handler is the SIM TakeOver Protection Handler and handles all queries and request that is sent or passed to the service.

The invention comprises, but is not limited to, at least one database component used to store all the data and containing a plurality of tables. A first table called MSISDN_IMSI_Mapping in this example contains the following columns:

| Column | Values | Description |
| --- | --- | --- |
| Org_ID | Alphanumeric | Stores the organisation ID of the service provider, e.g. Bank, credit card company, etc |
| MSISDN | Alphanumeric | The service Provider's user MSISDN |
| Current IMSI | Alphanumeric | The current corresponding IMSI for the MSISDN |
| Current IMSI Write Date Time | Alphanumeric | The date and time when the IMSI was recorded in the system |
| Old IMSI | Alphanumeric | If there was a previous IMSI, it will be stored here, and if the IMSI has changed, the current IMSI will be replaced and the previous value will be copied here |
| Old IMSI Write Date Time | Alphanumeric | If the IMSI has changed, the current IMSI date time will be replaced and the previous value will be copied here |
| Old IMSI Change Date Time | Alphanumeric | This will contain the date and time for when the Old IMSI was detected to have changed by the system |
| IMSI Verified Flag | BOOLEAN | Set to TRUE if the IMSI has been verified and FALSE if the IMSI has not been verified |

The table uses the following primary key and alternate key:
Primary Key: IMSI+MSISDN+Org_ID
Alternate Key: MSISDN+Org_ID The primary key and alternate key will be used when querying the table.

A second table, called IMSI_Alarm_table in this example, contains the following columns:

| Column | Values | Description |
|---|---|---|
| Org_ID | Alphanumeric | Stores the organisation ID of the service provider, e.g. Bank, credit card company, etc |
| MSISDN | Alphanumeric | The service Provider's user MSISDN |
| Current IMSI | Alphanumeric | The current corresponding IMSI for the MSISDN |
| Current IMSI Write Date Time | Alphanumeric | The date and time when the IMSI was recorded in the system |
| Old IMSI | Alphanumeric | If there was a previous IMSI, it will be stored here, and if the IMSI has changed, the current IMSI will be replaced and the previous value will be copied here |
| Old IMSI Write Date Time | Alphanumeric | If the IMSI has changed, the current IMSI date time will be replaced and the previous value will be copied here |
| Old IMSI Change Date Time | Alphanumeric | This will contain the date and time for when the Old IMSI was detected by the system to have changed. |
| IMSI Verified Flag | BOOLEAN | Set to TRUE if the IMSI has been verified and FALSE if the IMSI has not been verified |
| Alarm ID | Alphanumeric | This column contains the ID of the alarm that was raised. This will be a number that is incremented for each new alarm received in the table. |
| Alarm Raised Date Time | Alphanumeric | The is the date and time for when the alarm was raised by the system (the invention) |
| Alarm Clear Date Time | Alphanumeric | This is the date and time for when the alarm was cleared by the system or manually by the service provider or user of the system |
| Alarm Status | Alphanumeric | This is the current status of the alarm; New, Critical, major, minor, warning, Cleared, etc. |
| MSISDN Potentially Hijacked | Boolean | TRUE if system suspect MSISDN to be hijacked, FALSE if not. |

The following sequence explains how the above tables can be used to store the relevant information for the SIM Takeover Protection service:

1. A Service Provider 309 provides a service where an SMS text message or a phone call is made to a user's Mobile number (MSISDN).
2. In order to ensure that the Mobile number (MSISDN) which the service will contact has not been hijacked or compromised, the system 600 is incorporated into the service 309 to obtain the IMSI-MSISDN pairing prior to commissioning of the service.
3. The system 600 will prior to any communication to the mobile number (MSISDN) perform a MAP Send Routing Information (SRI) lookup on the MSISDN. This will be unknown to the mobile phone owner.
4. The SRI Lookup will return the IMSI of the MSISDN that the lookup was performed for.
5. The system 600 will then store the MSISDN together with the IMSI (in the "Current IMSI" column) and date and time when the IMSI was recorded in the MSISDN_IMSI_Mapping table (in the "Current IMSI Write Date Time" column)
6. The system now has a record of the IMSI registered to the MSISDN.

When a service provider, for example a bank or credit card company 309, wants to send a SMS text message with information or a 2-Factor Authentication code, or call a user's mobile phone 301, the system 600 can be used to check that the IMSI has not changed since the IMSI was first registered in the system. The service provider 309 is passed into the system 600 and is identified by the Organisation ID in the table. The system can then work in the following manner:

1. The system will again perform a Send Routing Information (SRI) Lookup request in the mobile network of the MSISDN in question.
2. The SRI Lookup will return with the current mobile network IMSI that is used for this Mobile number (MSISDN).
3. The system will check the retrieved IMSI against the IMSI stored in the MSISDN_IMSI_Mapping table previously for the MSISDN and Org_ID in question. The system exposes a method for checking the following: Org_ID+MSISDN+IMSI (Example query: select * from table where Org_id=X, MSISDN=Y and IMSI=Z).
4. If the there is an entry of the above query, it means that the MSISDN and IMSI are matching for that Org_ID, and the mobile number (MSISDN) is most likely not compromised.
5. If there is NO entry in the table for the query above, then perform a second query to see if there is an entry for the MSISDN and the Org_ID (using the alternate key) exists.
6. If the second query on the MSISDN and Org-ID returns any data (meaning there is an entry for the MSISDN, but with a different IMSI), the system will do the following:
    a. Copy the value of the "Current IMSI" column to the "Old IMSI" column.
    b. Copy the value of the "Current IMSI Write Date time" to the "Old IMSI Write Date Time" column.
    c. Set the "Old IMSI Change Time" to the current time.
    d. Update the "IMSI Verified Flag" to FALSE as there was a change to the IMSI, but the new IMSI has not been verified.
    e. Update the "Current IMSI" and "Current IMSI Write Date Time" with the new values that were obtained from the SRI lookup.
7. If there is a change to the IMSI for an MSISDN, then write all the info to the IMSI Alarm Table and update the Alarm time stamp details. The system would also set the "MSISDN Potentially Compromised" column to TRUE. The Alarm status will be set to new.

The Mobile Network Interrogator component handles all the queries to the mobile network. This includes the MAP Send Routing Information requests to obtain the IMSI corresponding to the MSISDN. The actual SRI Lookup functionality can either reside inside the component, or it can integrate to a mobile service provider 309 that can handle the lookup query on behalf of the service. The Mobile Network Interrogator will query the mobile network to obtain the IMSI for the MSISDN in question.

The system will also have an Operation & Maintenance server (O&M server). This server will handle all the alarms from the system itself. A Statistics Server will record and log all statistics in the database or relevant files on the files system. The Statistics Server will record statistics about, but is not limited to, the number of IMSI lookups performed, successful IMSI lookups, failed IMSI lookups, number of IMSI changes, etc.

The Security server handles all the security aspects. This includes management of User Access rights, handling of security certificates, etc. The Management Application is the User Interface where either the external organisation can log into check alarm and status of IMSI queries. The Management Application is a, but is not limited to, a web based client where the user can securely log into.

Figure 7A:
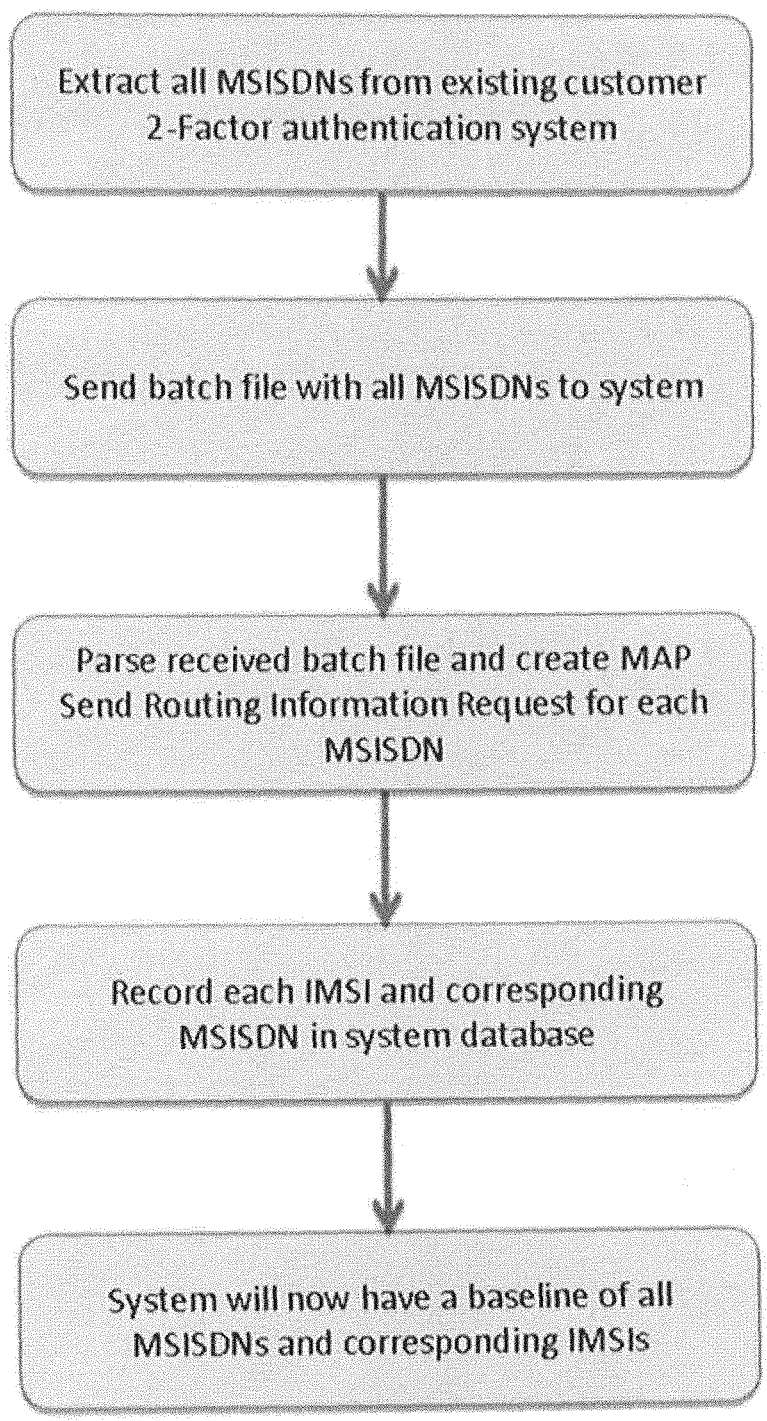
FIGS. 7A, B &C describes a number of embodiments of a first method performed by the system of FIGS. 3 to 6 in which all MSISDNs in an external system (in the example a 2-Factor Authentication system) can be registered at the server.

Any embodiment of the method performed at the server 308 in connection with any one or more of the mobile terminals 301 according to the invention, as performed in the environment of FIG. 3, requires an initial registration of all MSISDNs and corresponding IMSIs in the system and corresponding data processing steps are described hereafter with reference to FIG. 7a, which illustrates the registration phase of the SIM Takeover Protection service. It is envisaged that the MSISDNs are extracted from an existing external system 309, for example a 2-Factor Authentication service 309.

1 All existing MSISDNs are extracted from the 2-Factor solution into a batch file. The batch file is a flat file with MSISDNs for all users registered in the 2-Factor Authentication system.
2 The batch file is sent to the SIM Takeover Protection Service. The batch file can be sent as a file using FTP/SFTP or it can be loaded into a secure web application.
3 The SIM Takeover Protection Service will receive the batch file and parse all the MSISDNs from the file. The SIM Takeover Protection service will then create a MAP Send Routing Information request for all MSISDNs and query the telecommunications network.
4 Each MAP Send Routing Information request will result in a response where the current IMSI for the MSISDN in question is present. As the responses come in, all IMSIs and corresponding MSISDNs are recorded in the SIM Takeover Protection service. The MSISDN is stored in the MSISDN column, the IMSI is recorded in the "Current IMSI" column, and the "Current IMSI Write Date time" is update with the time the response was received. As this will form a baseline for all IMSI-MSISDN pairs, the ""IMSI Verified Flag" is set to TRUE.
5 When the IMSI has been obtained and recorded from all MSISDNs that were sent in, the system will have a baseline that can be used when the SIM Takeover Protection service will check the IMSI for any MSISDN that should receive an authentication code from the 2-Factor Authentication System.

Figure 7B:
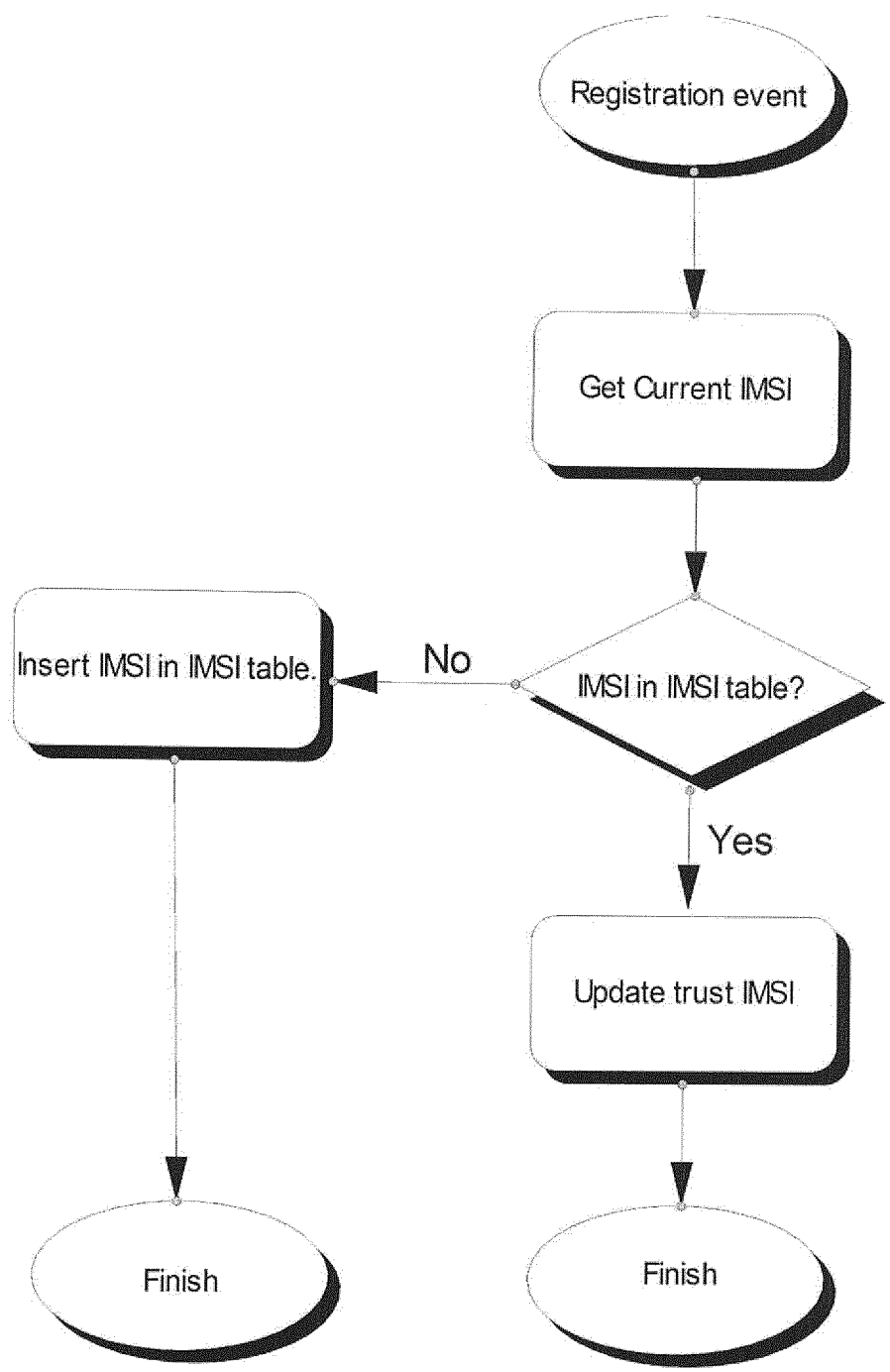

At its simplest, the method of the system, as shown with reference to FIG. 7b performs the following steps:

At registration, the solution first queries the users IMSI and stores it in a database, as described.

Whenever any interaction occurs with the user (similar to what was described above) the IMSI is again obtained from the mobile network and compared with the one stored at registration.

If the current IMSI matches the one stored at registration then the system can trust that it is communicating with the actual user.

If the current IMSI does not match the one stored at registration then there is a possibility that a fraudster has swapped the SIM card and is now in full control of the user's mobile number.

For both an IMSI match and an IMSI mismatch the service will feedback to the appropriate response to the bank's (or other organisation's) system.

The following text describes how the service operates in basic use cases.

Phone Call Use Case
The service is integrated into a call centre (e.g. a banks call centre).
When a call is placed from the call centre to a customer the call centre's phone system queries the service to verify the IMSI of the customers phone hasn't changed.
If the response from the service indicates that the IMSI has changed, an audio message indication is played/overlaid on the call such that it is only audible to the customer care representative. The message indicates that the call may be compromised and that the customer care representative should now seek further clarification from the person they are talking with to verify they are actually the legitimate person Send One Time Password (OTP) Use Case
Bank wants to send a OTP to a customer.
Two OTP's (GENUINE_OTP and SUSPICIOUS_OTP) are presented by the bank to the service.
The service will temporarily hold the OTP's.
Next the service will obtain the current IMSI for the recipients mobile.
If the current IMSI matches the trusted IMSI stored in the service then the service will send the GENUINE_OTP to the customer as an SMS message.
If the current IMSI does not match the trusted IMSI stored in the service, then the service will send the SUSPICIOUS_OTP to the customer as an SMS message.
Depending on the current IMSI matching or not matching the trusted stored IMSI, an appropriate response will be returned to the banks system allowing the banks system to handle the customer differently.
When the recipient receives the SMS message they enter the OTP they received into the service they are trying to access.
In addition to the system response sent back to the banks system, based on the OTP received and entered by the recipient (GENUINE_OTP or SUSPICIOUS _OTP) the service can treat how the user is handled differently.
If the OTP is to authorise a bank website login and the SUSPICIOUS_OTP is used, then user may be denied access or given reduced access within the site (can't setup new beneficiaries etc. . . . ). Entering the GENUINE_OTP enables full access.
If the OTP is used to confirm a 3D Secure transaction then a GENUINE_OTP authorises the transaction but a SUSPICIOUS _OTP will result in the transaction being declined.
The above ensures the bank can protect the customer appropriately but it does not alert the fraudster to the fact that the bank is aware of the SIM change.

NFC Payment Use Case
An NFC enabled phone is used to make a contactless payment
When this payment is presented to the bank for payment (NFC payments are usually offline so presentation of the payment to the bank usually takes a period of time from when the payment is actually made to when its presented for payment) the service is queried to verify that the current IMSI matches the trusted IMSI stored in the service.
If the current IMSI matches the trusted stored IMSI then the transaction is authorised
If the current IMSI does not match the trusted stored IMSI then the transaction is declined or can be flagged for further investigation before being authorised Smartphone Usage
An application running on a smartphone is used to interact with an organisation (e.g. a mobile banking app).
The service is queried to verify that the current IMSI matches the trusted IMSI stored in the service.
If the current IMSI matches the trusted stored IMSI then the organisation can allow full App functionality.

If the current IMSI does not match the trusted stored IMSI then the organisation can prevent the App access to its network or it can allow restricted App Functionality (e.g. the App isn't allowed to setup new beneficiaries etc. . . . ).

Figure 7C:
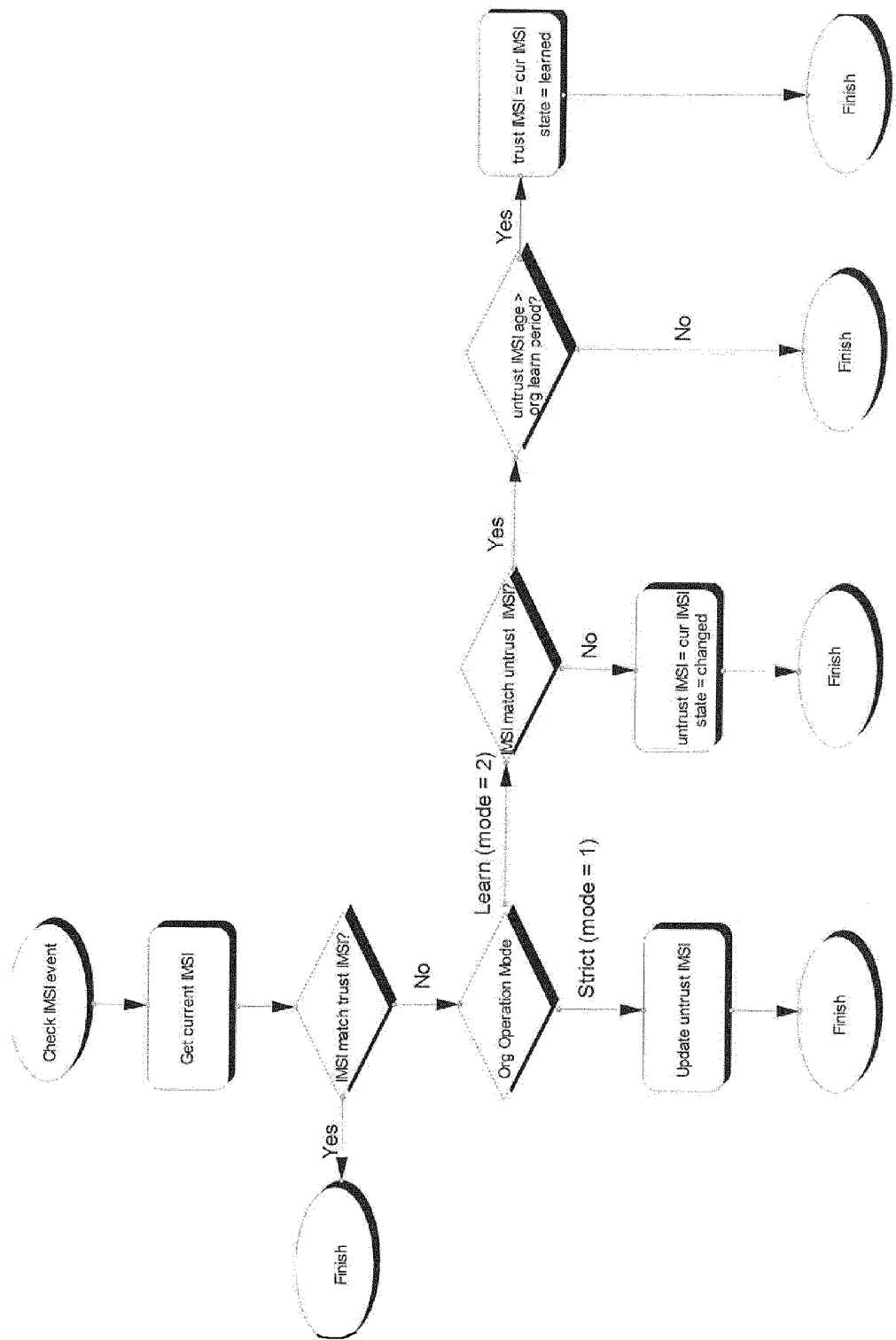

In one embodiment of the invention there is provided an auto learn functionality as illustrated in FIG. 7c:

If a fraudster uses identity theft to perform a SIM change, it gives the fraudster a fraud window of no more than a few hours, a day at the most. After that the system can safely assume that the legitimate phone user will notice a problem with their phone, contact their mobile operator and the phone user will recover control of their phone number by performing a legitimate SIM change.

Each time a SIM change is done the IMSI will change.

When the service identifies that the current IMSI is different to the trusted IMSI stored within the service it will record the current IMSI as well as the time the check was performed.

When the service is again queried by the organisation for this phone user

And if the current IMSI matches the suspect IMSI from the last service check.

And if a sufficient length of time has passed between the two IMSI network checks.

Then it can be assumed that the suspect IMSI was a legitimate IMSI change.

At this point the current IMSI will become the trusted IMSI and stored in the service.

The system can be adapted to be self-learning over time.

While the above is concerned with detecting SIM Change, it is also possible to use the same technology and logic to detect hardware changes. Instead of querying just the IMSI, the system can also query the International Mobile Station Equipment Identity (IMEI), or Integrated Circuit Card ID (ICCID), or Mobile Equipment Identifier (MEID) (depending on the mobile network architecture in use) using the same process. The use cases will be very similar, if not identical, to those above, applying to any case where checking a hardware change is useful in detecting fraud.

The IMEI/ICCID/MEID can identify the make and model of a phone, which can be used to identify the truthfulness of a new customer, where the customer is asked to enter the make and model of their phone.

Transaction Non Repudiation

Mobile Payments are become becoming much more prevalent. An important element of any such transaction is Transaction Non-Repudiation. As Mobile Payments become the norm rather than the exception, instances of customers denying transactions through claiming phone theft is increasing.

At the time a mobile payment/transaction occurs, using the technology described above, the SIM Card IMSI and Mobile Phone Hardware IMEI/ICCID/MEID, can be recorded & stored along with the transaction information.

Should the customer later attempt to deny the transaction, claiming phone theft

The customer representative can ask the customer if they recovered their phone. The customer will most likely state that they did not recover their phone.

Next, the customer representative can ask the customer if they had to ask their operator to change their SIM card in order to recover use of their Mobile Phone number. The customer will most likely state that they did.

At this time, the customer care representative triggers a check on the customers current IMSI & IMEI/ICCID/MEID.

This is compared, by the service, with the IMSI & IMEI/ICCID/MEID which was stored along with the transaction in question.

If the current IMSI & IMEI/ICCID/MEID match the IMSI & IMEI/ICCID/MEID stored with the transaction details, then clearly the customer is untruthful.

Fraudster Uses Many SIM Cards with the same mobile phone terminal, since such terminals are expensive, whereas SIM Cards are not. Fraudsters tend to change numbers frequently in order to deceive. The service can usefully detect patterns of repeated use of a same IMEI/ICCID/MEID with multiple IMSIs, and isolate communication accordingly.

Figure 8:
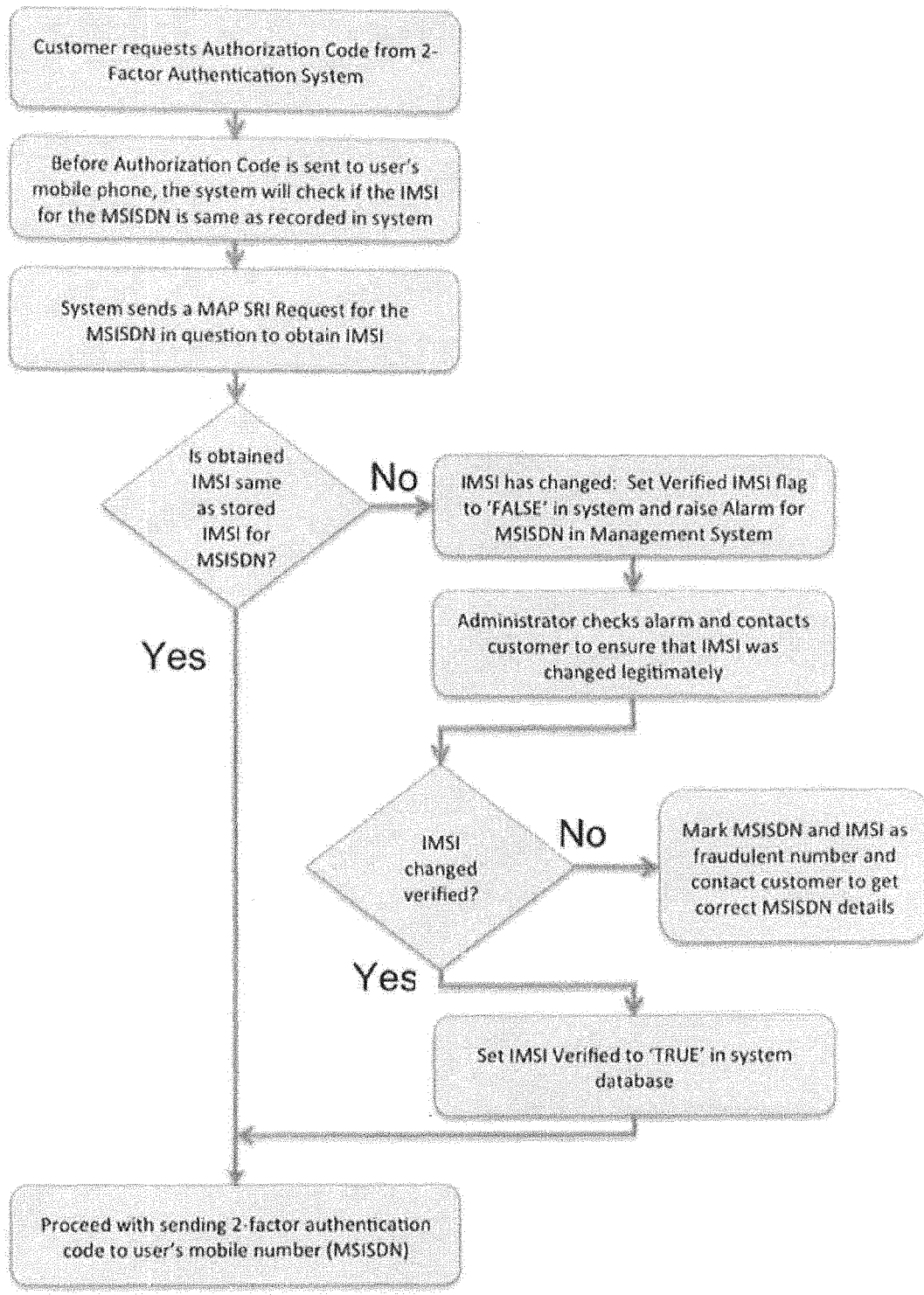
FIG. 8 describes an embodiment of a further method performed by the system of FIGS. 3 to 6 further to the method of FIG. 7, in which the 2-Factor Authentication systems sends out an authentication code to a mobile computing device and the server checks the current IMSI against the IMSI registered in the system.

With reference to FIGS. 8 to 12 now, several specific use cases are shown therein and individually described in further detail hereafter. FIG. 8 illustrates a first use case of the system where the SIM Takeover Protection service is used together with a 2-factor Authentication service that sends the authorisation code to a user's mobile phone. The user can be any user of a bank or a service provider 309 that will use 2-factor authentication to gain access to a specific website, portal, or similar. This use case assumes that the IMSI for each mobile phone number in the 2-factor authentication system has been recorded and verified. The service significantly strengthens sending a text message with One-Time-Password (OTP) for 3D secure transactions.

1 The user is trying to access a secure webpage that require a second access code. The user requests an authorization code from a 2-factor authentication system.

The 2-Factor Authentication system will then integrate to the SIM Takeover Protection service to verify the if the IMSI of the mobile phone has changed since it was initially registered and recorded in the system. The 2-Factor Authentication system will send a request to the SIM Takeover Protection using the exposed interface. The following information will be sent in the verify IMSI request; User MSISDN.

3 The SIM Takeover Protection will receive the request with the user's MSISDN and construct a MAP Send Routing Information (SRI) request to the telecommunication network. The response to the MAP SRI request will among other parameters return the IMSI currently belonging to the MSISDN.

4 The SIM Takeover Protection will then retrieve the registered IMSI for the MSISDN and compare it to the current IMSI received in the SRI response. If the current IMSI is the same as the registered IMSI for the MSISDN in question, then a response will be sent back to the 2-Factor Authentication service to indicate that the IMSI has not changed for the MSISDN in question and that the authentication code can securely be sent to the Mobile Phone Number (MSISDN) registered for that user.

5 The 2-Factor Authentication service will then send the authorization code to the user.

6 If the current IMSI has changed from the IMSI registered in the SIM Takeover Protection service, the "IMSI Verified Flag" is set to FALSE and copy the registered IMSI "Current IMSI" value to the "old IMSI" column, copy the "Current IMSI Write Date time" to the "Old IMSI Write Date Time" column and set the "Old IMSI Change Time" to the current time. The "Current IMSI" and "Current IMSI Write Date Time" are updated with the new values that were obtained from the SRI Lookup. As there is a change to the IMSI for the MSISDN, all columns in the IMSI Alarm table is populated with the relevant data and time stamps. As the IMSI Alarm table is updated with the IMSI change, and alarm is raised in the Management System for the MSISDN in question.

7. The administrator of the Management System will monitor the system and see the alarm that is raised for the IMSI change. This will prompt the administrator to contact the user to verify if he or she recently have changed the SIM card (and thereby IMSI) of their mobile phone. The administrator would ask various security questions that they would have for the user to ensure that they are speaking to the correct user and person.
8. After the administrator has contact the user, the administrator will know whether or not the SIM (IMSI) was changed legitimately or not.
9. If the SIM change was valid and legitimate, the operator can clear the alarm in the Management System and select that the IMSI changed has been verified. This will update the "IMSI Verified Flag" to TRUE and change the alarm status in the IMSI Alarm table to status "Cleared".
10. The SIM Takeover Protection system is then updated with the correct IMSI and the user can request the 2-Factor Authentication code to be sent again, or the administrator can trigger it to be sent from the Management System.
11. Should the user fail to verify himself/herself to confirm the IMSI change, the SIM Takeover Protection service will mark the MSISDN and IMSI as fraudulent to prevent any 2-factor authentication codes to be sent to this Mobile number (MSISDN). The provider of the 2-Factor authentication system will then contact the user by other means to get his/her correct Mobile Number.

Figure 9:
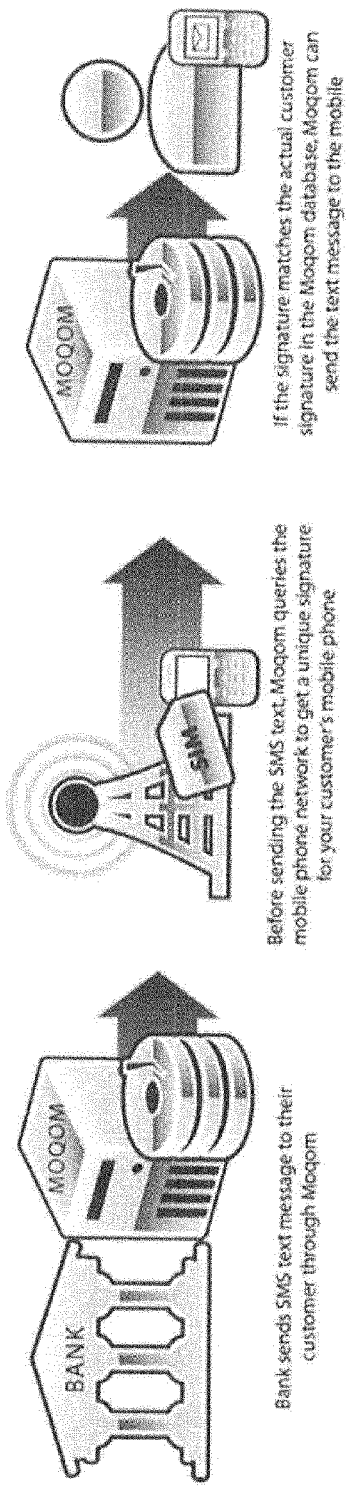
FIG. 9 describes an embodiment of a further method performed by the system of FIGS. 3 to 6, in which the SIM Takeover Protection system of the invention ensures that a mobile computing device has not been compromised.

FIG. 9 illustrates how the SIM Takeover Protection service can ensure that a bank user's mobile phone has not been compromised or that the SIM card has been changed. The SIM Takeover Protection service is integrated to a Bank's SMS notification system. This use case assumes that the bank user's MSISDN and corresponding IMSI have been registered in the SIM Takeover Protection service.

1. Prior to sending any information to a user, e.g. using SMS text messages to the bank user's mobile phone, the bank will send the SMS text message to the SIM Takeover Protection service.
2. The SIM Takeover Protection Service will then query the mobile network for the target MSISDN in order to obtain the current IMSI for the MSISDN in question. The mobile network is queried using a MAP SRI Lookup request.
3. The SIM Takeover Protection service compared the current IMSI with the registered IMSI for the MSISDN in question. If both the registered IMSI and the current IMSI is a match, the SMS message is sent to the user's mobile phone. If the two IMSIs do not match, the SIM Takeover Protection service will raise an alarm and may not send the SMS text message to the user's mobile number (configurable).

Figure 10:
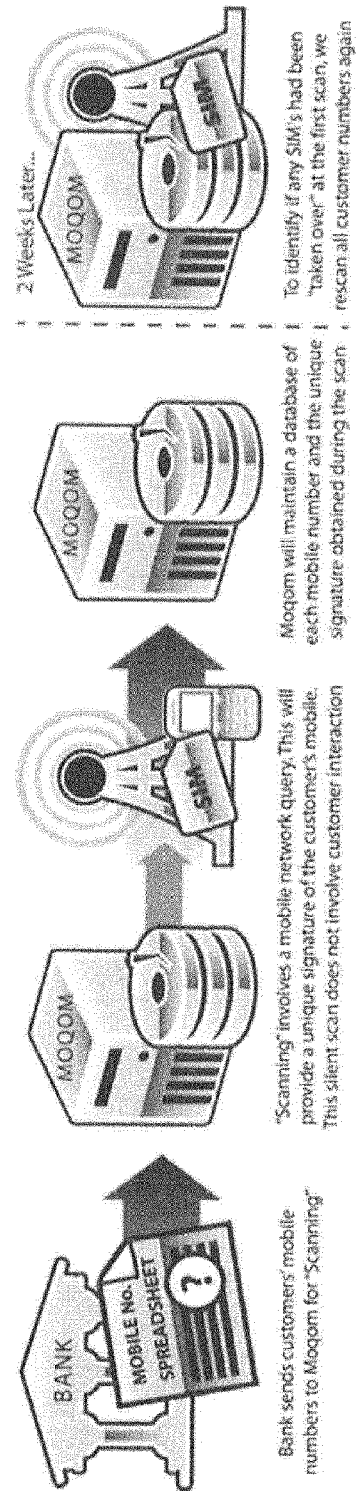
FIG. 10 describes an embodiment of a further method performed by the system of FIGS. 3 to 6, in which the SIM Takeover Protection system of the invention obtains and records a baseline of the IMSI-MSISDN mapping for a Service Provider's existing user.

FIG. 10 illustrates how the SIM Takeover Protection service will obtain and record a baseline of the IMSI-MSISDN mapping for a Service Provider's existing user. The use case assumes that the SIM Takeover Protection is integrated to a bank system that will send SMS text messages to their user with information about transactions and/or a one-time password.

1. The Bank will extract all existing user's mobile numbers and send them to the SIM Takeover Protection service for scanning. The Mobile Numbers can for example be sent to the SIM Takeover Protection in an Microsoft Excel Spreadsheet, or it can be sent in a batch file or similar.
2. The SIM Takeover Protection Service will then query the mobile network for the target MSISDN in order to obtain the current IMSI for the MSISDN in question. The mobile network is queried using a MAP SRI Lookup request.
3. The IMSI for each Mobile number (MSISDN) sent in from the bank to the SIM Takeover Protection service will be recorded and stored in the database together with the corresponding MSISDN.
4. The same process of querying all existing user's Mobile Numbers (MSISDNs) can be repeated two weeks later. The purpose of this is to identify any changes to any IMSI for user to see if any mobile numbers might have been compromised.

Figure 11:
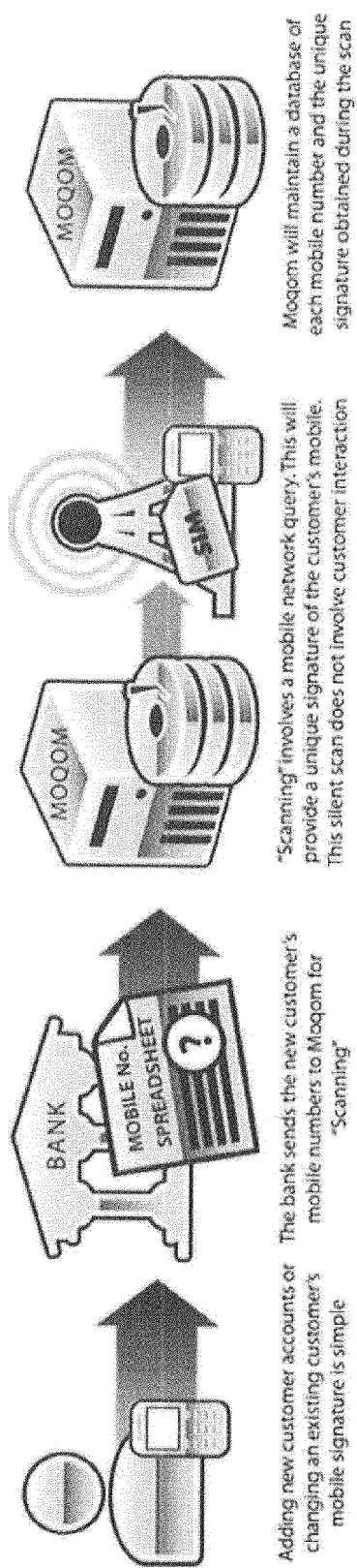
FIG. 11 describes an embodiment of a further method performed by the system of FIGS. 3 to 6, in which the SIM Takeover Protection system of the invention registers new users and updates legitimate changes to their respective mobile numbers.

FIG. 11 illustrates how the system can be used when adding new users or changing existing user's Mobile number that are registered or using the service. The use case assumes that the service is already integrated into a bank and that existing users has already been registered in the system.

1. The bank will at regular intervals scan their system to retrieve the mobile numbers for all new and modified users. The bank will generate a list of all mobile numbers that has been added or changed since the last scan. The bank will then send the list of the changed or new mobile numbers to the SIM Takeover Protection service.
2. The SIM Takeover Protection Service will then parse all the mobile numbers received from the bank and start querying the mobile network for these Mobile numbers. The SIM Takeover Protection service will query the mobile network using a MAP SRI Lookup to obtain the IMSI for each mobile number. This lookup is performed unknown to the mobile phone owner.
3. The SIM Takeover Protection service will then parse the response from the MAP SRI request and store each Mobile number (MSISDN) and corresponding IMSI in the database. This information will form a unique signature for each mobile number stored in the system.

Figure 12:
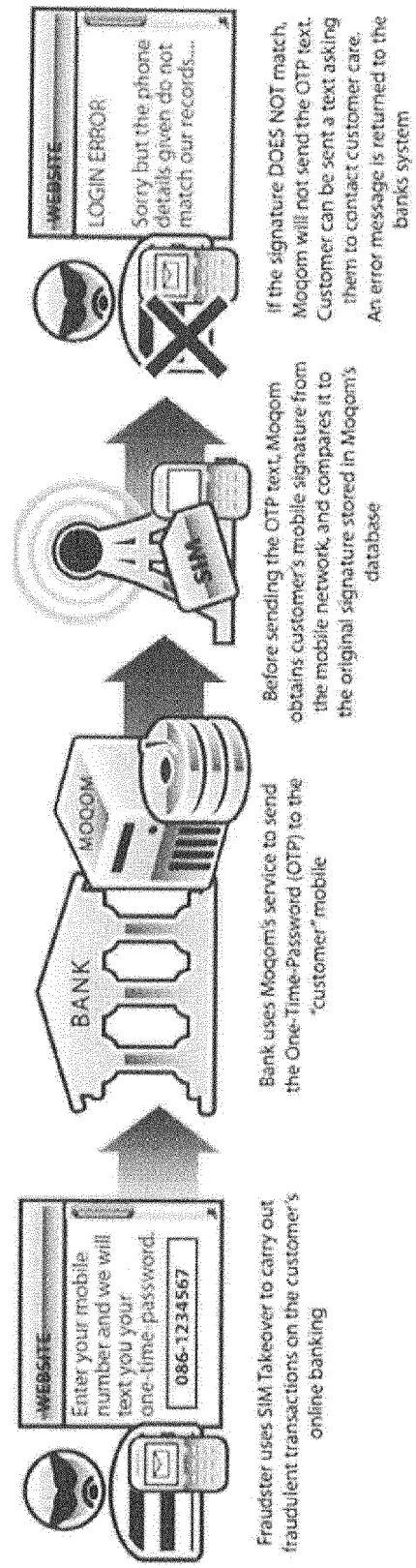
FIG. 12 describes an embodiment of a further method performed by the system of FIGS. 3 to 6, in which the SIM Takeover Protection system of the invention is used in the context of a user network request for a One-Time-Password (OTP) for use with an online banking login.

FIG. 12 now illustrates, with reference to the identity theft example of FIG. 1, a use case where a fraudster has taken over a bank user's mobile phone and is trying to access a secure website by requesting a One-Time-Password to be sent to the account holder's mobile phone. The use case assumes that the real account holder and rightful owner of the mobile phone is registered and recorded in the SIM Takeover Protection service. The use case also assumes that the fraudster has managed to get information about the bank user's account details. The use case is described in the following way:

1. A fraudster takes over a bank user's mobile phone number. The bank user is set up to receive a One Time Password on their mobile phone when trying to access a secure online banking site. The fraudster logs on to the online banking site using the account holder's (and also the owner of the mobile phone) account details. The fraudster is prompted to enter the One-Time-Password that is sent to the account holder's mobile phone number on the secure web site.
2. The request for the One-Time-Password (OTP) is forwarded to the SIM Takeover Protection service to send the OTP to the account holder's mobile phone.
3. Before sending the generated OTP to the mobile number, the SIM Takeover Protection service will perform a MAP SRI Lookup on the mobile number (MSISDN) to obtain the current IMSI of the mobile number. The current IMSI will then be compared to the IMSI that was previously stored (and verified) for the same MSISDN in the database.

4. If the current IMSI and the registered IMSI (the one stored previously or during registration) does not match, the SIM Takeover Protection service will not send the One-Time-Password to the mobile number, but will instead reply to the mobile number (now taken over by the fraudster) that the mobile signature does not match and that the OTP was not sent for this reason. At the same time, the SIM Takeover Protection service will raise an alarm for this mobile number to alert the bank that someone has requested a One-Time-Password to be sent to a mobile number that has changed signature (or IMSI). The bank can then investigate further or disable One-Time-Password for this user. In this use case the system will prevent the bank from sending the One-Time-Password to the wrong person, and thereby prevent that a fraudster will access the secure site.

Figure 2:
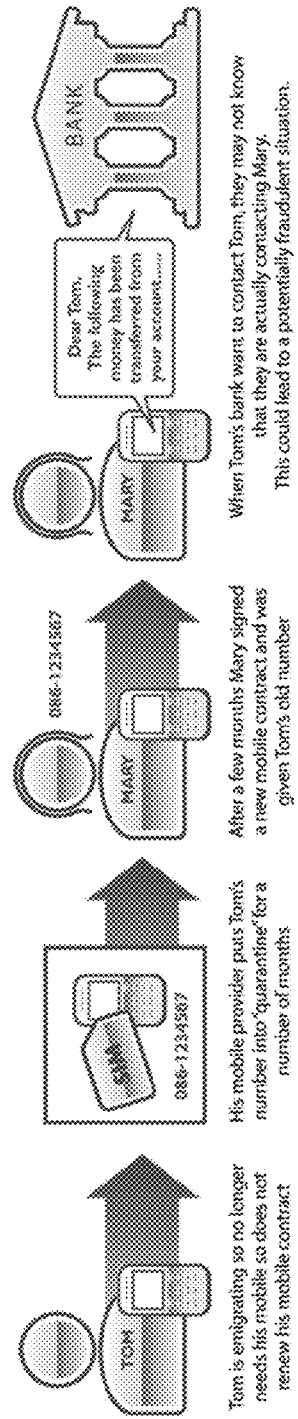
FIG. 2 illustrates an example of potential fraud as the result of churn in a mobile network, wherein a later user is assigned an archived, disused mobile number of a previous user still associated with recoverable personal and/or financial information.

Accordingly, the method of the system, when applied to the churn example of FIG. 2 of a person terminating a mobile contract and giving up their mobile number which another person takes over after a quarantine period, provides the following sequence of steps, wherein it is again assumed that the mobile number is already registered in the SIM Takeover Protection service for the original owner:

1. A bank user called Tom is leaving the country and no longer wishes to keep the mobile number. Tom calls the mobile phone operator to cancel his mobile phone contract.
2. The mobile phone provider will cancel Tom's contract and put the mobile number into quarantine for a given period, e.g. a number of months.
3. After a while, e.g. 3 months, the mobile number is no longer in quarantine. A new person called Mary signs a new contract with the mobile provider and is given the same number as Tom previously had.
4. Tom had forgotten to notify the bank that he is no longer using the mobile number that they have on record for him. The bank tries to the contact Tom on the mobile number that is registered for Tom in the system by sending him a SMS text message with some account information (alternatively the bank could also attempt to call Tom on the mobile number). The bank has integrated their notification solution with the SIM Takeover Protection service. The SIM Takeover Protection service will prior to sending a message to the account holder's mobile number, check that the IMSI for the mobile number in question has not changed. The system will perform a MAP SRI Lookup on the MSISDN to obtain the corresponding IMSI. The SIM Takeover Protection service will compare the IMSI registered for the MSISDN with the current IMSI obtained from the MAP SRI Lookup response. If the current IMSI and the registered IMSI (the one stored previously or during registration) does not match, the SIM Takeover Protection service will not send the notification or SMS text message to the account holder's mobile number. This will prevent sensitive information from being sent to the wrong person.

In an embodiment of the system, when an SMS text message is to be sent any given mobile phone number, the SMS-Centre that is used to send the text message will query the Home Location Register (HLR) (or similar database such as a Home Subscriber Server (HSS)) in the called party's mobile network (via the HLR/HSS of the calling network). One such HLR/HSS query used to obtain this information is a Mobile Application Part (MAP) called Send Routing Information (SRI). Such queries will be used to identify the IMSI and/or ICCID. This method will allow the system to identify the IMSI and/or ICCID of any given mobile phone number (MSISDN).

The step of obtaining the IMSI for a mobile terminal comprises of sending a Mobile Application Part (MAP) message over the network. Sending a MAP message comprises of sending a MAP Send Routing Information (SRI) or Send Routing Information Short Message query.

An embodiment of the SIM Takeover Protection system may implement the following method:

1. Prior to start using the SIM Takeover Protection system 600 all Mobile Phone Numbers (MSISDN) and corresponding IMSI must be registered for all existing users of the Service Provider, e.g. a Bank or a Credit Card company 309. This registration process will happen in the background and will be unknown to the user or owner of the MSISDN.
2. The system will query the mobile phone network in order to obtain a unique signature (IMSI) of the user's Mobile Phone. This will be done by performing a MAP SRI Lookup request on all the user's MSISDNs.
3. The response from the MAP SRI Lookup includes the MSISDN and corresponding IMSI.
4. All MSISDNs and corresponding IMSIs will be stored in a database residing in the SIM Takeover Protection service. These initial MAP SRI Lookups will form a baseline for the mapping between IMSI and MSISDN.
5. When a Service Provider 309 wants to use the SIM Takeover Protection service 600 to ensure that the user's IMSI has not changed, all SMS text messages or phone calls are routed through the SIM Takeover Protection.
6. Before a call is made or an SMS text message is sent to the Service Provider's user, the SIM Takeover Protection service system 600 performs a MAP Send Routing Information (SRI) lookup on the user's MSISDN to where the SMS text message or phone call is aimed for.
7. The response from the MAP SRI Lookup will again contain the current IMSI corresponding to the MSISDN in question.
8. The current IMSI will then be compared to the IMSI that was registered in the system for the MSISDN in question.
9. If the registered IMSI and the current IMSI is the same for the MSISDN, the SIM Takeover Protection will deem the MSISDN safe and the SMS text message will be sent or a phone call can be made to the user.
10. If the registered IMSI and the current IMSI is different, it can indicate that the MSISDN has been taken over by another party. The SIM Takeover Protection service will raise an alarm or notify the Service Provider 309 to contact the user to confirm if the IMSI change is legitimate or not. The SIM Takeover Protection service will also not send the SMS text message or make the phone call to the user until the IMSI change has been verified. The SIM Takeover Protection could optionally send an informational SMS text message to the mobile number asking the user to contact user care. This is to address the situation where the user has actually changed the SIM card itself.

To further enhance the security, the system 600 can perform random checks of all or selected MSISDN registered in the system to check and verify if there has been any change to the IMSI. If there are any differences in the IMSI for a registered MSISDN, the system can raise an alarm.

Another embodiment of the SIM Takeover Protection system may implement the following method:
1. Service Provider 309 is logged into the User Management System and is observing any alarms coming in.
2. When an IMSI has changed for an MSISDN, the relevant information is inserted into the IMSI Alarm table. An alarm will then be raised in the User Management System.
3. The Service Provider is alerted to contact the user that is registered for the Mobile Phone number (MSISDN). The alarm could for example state; "Investigation has shown that the MSISDN is fraudulent and should not be trusted.".
4. Service Provider 309 contacts the user to verify if the user has changed mobile phone operator or SIM card. The Service Provider 309 would first authenticate the user with a series of security questions to ensure that they are talking to the correct person.
5. If the Service Provider 309 successfully identifies the user and the IMSI change, the Service Provider can clear the alarm in the User Management System. The system will then do the following:
    a. Clearing the alarm for the relevant MSISDN by changing the alarm status in the IMSI Alarm table.
    b. Update relevant timestamps in the IMSI Alarm Table.
    c. Update the "Verified IMSI Flag" to TRUE in the MSISDN_IMSI_Mapping table.
    d. Update relevant timestamps in the MSISDN_IMSI_Mapping table.
6. The alarm is now cleared and the correct IMSI has been registered for the MSISDN in the MSISDN_IMSI_Mapping.

A further use case may involve obtaining the IMSI from a foreign mobile phone network:
1. A bank (or other organisation) presents a foreign Mobile number (Mobile Subscriber Integrated Services Digital Network-Number—MSISDN) to the system, over the network.
2. SIM Takeover Protection service use an XML message to query the signalling gateway.
3. The Signalling Gateway then uses a MAP Send Routing Information (SRI) (there are other MAP alternatives to obtain an IMSI, such as the SS7 MAP-SEND-IMSI operation) to query the gateway mobile network that the signalling gateway is connected to.
4. The gateway mobile network then routes the MAP-SEND-IMSI query to the Home Location Register (HLR) (or similar database such as a Home Subscriber Server (HSS)) in the foreign mobile phone network to which the mobile number belongs.
5. As part of the business agreement, the foreign network operator will already have allowed requests from the Signalling Gateways Global Title for the MAP-SEND-IMSI query.
6. This MAP-SEND-IMSI operation on the foreign HLR (or similar database such as a Home Subscriber Server (HSS)) will return the IMSI to the signalling gateway via the gateway operator.
7. The IMSI is returned to the SIM Takeover Protection service.

It will be readily understood by the skilled that additional SS7 MAP operations, other than MAP-SEND-IMSI, may be used to obtain the IMSI and that the scope of the principles presently disclosed extends to any single MAP query or combination of MAP queries for obtaining the IMSI for the purpose.

The embodiments in the invention described with reference to the drawings generally comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical, optical, quantum or chemical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for preventing fraudulent use of a Mobile Subscriber Integrated Services Digital Network Number (MSISDN) of a mobile phone terminal in a wireless network, comprising the steps of:
associating an International Mobile Subscriber Identity (IMSI) with a respective MSISDN for the mobile phone terminal;
storing the associated IMSI and MSISDN; and
upon receipt of a network request from the mobile phone terminal for a secure resource;
extracting the MSISDN from the network request;
constructing a Mobile Application Part (MAP) message request to the wireless network for the extracted MSISDN;
obtaining the IMSI currently associated with the MSISDN in the wireless network in reply to the MAP request;
comparing the obtained IMSI with the stored IMSI for the extracted MSISDN;
upon a condition that the obtained IMSI matches the stored IMSI for the extracted MSISDN, validating the network request; and
upon a condition that the obtained IMSI does not match the stored IMSI for the extracted MSISDN, sending a message to said mobile phone terminal and authenticating the unmatched IMSI using an identifier associated with said mobile phone terminal, and replacing the stored IMSI with the authenticated unmatched IMSI.

2. The method of claim 1, wherein the associating step comprises the further steps of performing a MAP message request on a communicated MSISDN and obtaining the IMSI currently associated with the communicated MSISDN in reply.

3. The method of claim 1, wherein the associating step comprises the further steps of performing a MAP message request on a communicated MSISDN and obtaining the IMSI currently associated with the communicated MSISDN in reply and the associating step comprises the further step of receiving a communicated batch file storing at least a plurality of MSISDN.

4. The method of claim 1, wherein the step of storing comprises the further steps of date—stamping and time—stamping the associated IMSI and MSISDN.

5. The method of claim 1, wherein the associating step comprises the further step of associating a provider of secure resources with the associated IMSI and MSISDN.

6. The method of claim 1, comprising the further step of generating an alarm if the obtained IMSI does not match the stored IMSI for the extracted MSISDN.

7. The method of claim 1, comprising the step of generating an alarm if the obtained IMSI does not match the stored IMSI for the extracted MSISDN; and automatically notifying the provider if the obtained IMSI does not match the stored IMSI for the extracted MSISDN.

8. The method of any claim 1, comprising the further step of obtaining position data of the mobile phone terminal from positioning means thereof.

9. The method of claim 1, wherein the step of validating further comprises automatically communicating the requested secure resource to the mobile phone terminal.

10. The method of claim 1, wherein the network request from the mobile phone terminal for a secure resource is selected from the group comprising a phone call, a Short-Message-Service (SMS) message, a near-field, routed wireless electronic transaction, data request from software running on a mobile phone terminal or a stand-alone secure resource, for example, but not limited to, accessing an online banking portal or accessing a secure remote server.

11. The method of claim 1 wherein the method identifies that the current IMSI is different to a trusted stored MSI stored within the service, the method comprises the steps of storing the current IMSI as well as the time the query was performed such that when another query is performed the current IMSI matches the suspect IMSI from the last query check and if a sufficient length of time has passed between the two IMSI checks a determination can be made that the suspect IMSI comprises a legitimate IMSI change.

12. The method of claim 1 comprising the step of generating a first and a second one time passwords and temporarily stored, wherein in response to a query, if the current IMSI matches a trusted IMSI stored in the service then the service will send the first one time password to the mobile phone terminal enabling one level of access to the secure resource or if the current IMSI does not match the trusted IMSI stored in the service, then the service will send the second one time password to the mobile phone terminal enabling a second level of access to the secure resource.

13. The method of claim 1 wherein the MAP message request comprises a Mobile Application Part (MAP) Send Routing Information (SRI) request.

14. A system for preventing fraudulent use of a Mobile Subscriber Integrated Services Digital Network Number (MSISDN) of a mobile phone terminal in a network, comprising:
    means for associating an International Mobile Subscriber Identity (IMSI) with a respective MSISDN for the mobile phone terminal;
    storage means the associated IMSI and MSISDN; and
    network means adapted to receive a network request from the mobile phone terminal for a secure resource;
    validating means adapted to extract the MSISDN from the network request;
    construct a Mobile Application Part (MAP) message request to the wireless network for the extracted MSISDN; obtain the IMSI currently associated with the MSISDN in the wireless network in reply to the MAP request; compare the obtained IMSI with the stored IMSI for the extracted MSISDN;
    upon a condition that the obtained IMSI matches the stored IMSI for the extracted MSISDN, validate the network request; and
    upon a condition that the obtained IMSI does not match the stored IMSI for the extracted MSISDN, sending a message to said mobile phone terminal and authenticating the unmatched IMSI using an identifier associated with said mobile phone terminal, and replacing the stored IMSI with the authenticated unmatched IMSI.

15. The system of claim 14, wherein the associating means and the storage means comprises at least one database and the validating means comprises a mobile network interrogator data processing module, stored and processed by a server operably connected to the wireless network.

16. The system of claim 14, wherein the associating means and the storage means comprises at least one database and the validating means comprises a mobile network interrogator data processing module, stored and processed by a server operably connected to the wireless network and the mobile network interrogator data processing module is adapted to perform a MAP SRI (or similar, for example MAP-SEND-IMSI or other appropriate MAP query) on a communicated MSISDN and to obtain the IMSI currently associated with the communicated MSISDN in reply.

17. The system of claim 14, wherein the associating means and the storage means comprises at least one database and the validating means comprises a mobile network interrogator data processing module, stored and processed by a server operably connected to the wireless network and the associating means further comprises a batch interface server data processing module adapted to receive a communicated batch file storing at least a plurality of MSISDN.

18. A set of instructions recorded on a non-transient data carrying medium which, when read from the medium and processed by a data processing terminal having networking means and configured as, or connected to, a wireless network gateway, configures the terminal to prevent fraudulent use of a Mobile Subscriber Integrated Services Digital Network Number (MSISDN) of a mobile phone terminal in a wireless network, by performing the data processing steps of:
    associating an International Mobile Subscriber Identity (IMSI) with a respective MSISDN for the mobile phone terminal;
    storing the associated IMSI and MSISDN; and
    upon receipt of a network request from the mobile phone terminal for a secure resource;
    extracting the MSISDN from the network request;
    constructing a Mobile Application Part (MAP) message request to the wireless network for the extracted MSISDN;
    obtaining the IMSI currently associated with the MSISDN in the wireless network in reply to the MAP request;
    comparing the obtained IMSI with the stored IMSI for the extracted MSISDN;
    upon a condition that the obtained IMSI matches the stored IMSI for the extracted MSISDN, validating the network request; and
    upon a condition that the obtained IMSI does not match the stored IMSI for the extracted MSISDN sending a message to said mobile phone terminal and authenticating the unmatched IMSI using an identifier associated with said mobile phone terminal, and replacing the stored IMSI with the authenticated unmatched IMSI.

19. A method for preventing fraudulent use of a Mobile Subscriber Integrated Services Digital Network Number (MSISDN) of a mobile phone terminal in a wireless network, comprising the steps of:

associating an Integrated Circuit Card Identifier (ICCID) with a respective MSISDN for the mobile phone terminal;

storing the associated ICCID and MSISDN; and upon receipt of a network request from the mobile phone terminal for a secure resource;

extracting the MSISDN from the network request;

constructing a Mobile a message request to the wireless network for the extracted MSISDN;

obtaining the ICCID currently associated with the MSISDN in the wireless network in reply to the message request;

comparing the obtained ICCID with the stored ICCID for the extracted MSISDN;

upon a condition that the obtained ICCID matches the stored ICCID for the extracted MSISDN, validating the network request, and upon a condition that the obtained ICCID does not match the stored ICCID for the extracted MSISDN sending a message to said mobile phone terminal and authenticating the unmatched ICCID using an identifier associated with said mobile phone terminal; and replacing the stored ICCID with the authenticated unmatched ICCID.

20. A system for preventing fraudulent use of a Mobile Subscriber Integrated Services Digital Network Number (MSISDN) of a mobile phone terminal in a network, comprising:

means for associating an Integrated Circuit Card Identifier (ICCID) with a respective MSISDN for the mobile phone terminal;

storage means the associated ICCID and MSISDN;

network means adapted to receive a network request from the mobile phone terminal for a secure resource;

validating means adapted to extract the MSISDN from the network request;

construct a message request to the wireless network for the extracted MSISDN; obtain the ICCID currently associated with the MSISDN in the wireless network in reply to the message request; compare the obtained ICCID with the stored ICCID for the extracted MSISDN;

upon a condition that the obtained ICCID matches the stored ICCID for the extracted MSISDN, validate the network request; and upon a condition that the obtained ICCID does not match the stored ICCID for the extracted MSISDN sending a message to said mobile phone terminal and authenticating the unmatched ICCID using an identifier associated with said mobile phone terminal; and replacing the stored ICCID with the authenticated unmatched ICCID.

* * * * *